(12) United States Patent
Bayer et al.

(10) Patent No.: US 8,001,719 B2
(45) Date of Patent: Aug. 23, 2011

(54) METHOD FOR PRODUCING RAPIDLY RENEWABLE CHITINOUS MATERIAL USING FUNGAL FRUITING BODIES AND PRODUCT MADE THEREBY

(75) Inventors: Eben Bayer, Troy, NY (US); Gavin McIntyre, Green Island, NY (US)

(73) Assignee: Ecovative Design, LLC, Green Island, NY (US)

( * ) Notice: Subject to any disclaimer, the term of this patent is extended or adjusted under 35 U.S.C. 154(b) by 19 days.

(21) Appl. No.: 12/456,408

(22) Filed: Jun. 16, 2009

(65) Prior Publication Data

US 2009/0307969 A1 Dec. 17, 2009

Related U.S. Application Data

(60) Provisional application No. 61/132,161, filed on Jun. 16, 2008.

(51) Int. Cl.
*A01G 1/04* (2006.01)

(52) U.S. Cl. .......................................... 47/1.1

(58) Field of Classification Search ............... 47/1.1; 435/254.1

See application file for complete search history.

(56) References Cited

U.S. PATENT DOCUMENTS

| | | | |
|---|---|---|---|
| 4,878,312 A * | 11/1989 | Shimizu | 47/1.1 |
| 5,370,714 A | 12/1994 | Ogawa | |
| 5,854,056 A * | 12/1998 | Dschida | 435/254.1 |
| 5,888,803 A * | 3/1999 | Starkey | 435/254.1 |
| 2008/0145577 A1* | 6/2008 | Bayer et al. | 428/35.6 |
| 2009/0307969 A1* | 12/2009 | Bayer et al. | 47/1.1 |

* cited by examiner

*Primary Examiner* — Francis T Palo
(74) *Attorney, Agent, or Firm* — Francis C. Hand; Carella, Byrne, Cecchi

(57) ABSTRACT

The method of growing a fungal fruiting body requires exposing a mycelium of a desired organism type to environmental conditions sufficient to induce fruiting of fungal primordium in the organism type followed by enclosing the fungal primordium within a mold of a designated shape representing a near net shape volume of a desired final product. The fungal primordium is allowed to grow and fill the mold to form a mass of fungal tissue equivalent in shape to the designated shape of the mold after which the mass of fungal tissue is removed from the mold and dried.

11 Claims, 25 Drawing Sheets

METHOD FOR PRODUCING RAPIDLY RENEWABLE CHITINOUS MATERIAL USING FUNGAL FRUITING BODIES AND PRODUCT MADE THEREBY

This invention claims the benefit of Provisional Patent Application No. 61/132,161, filed Jun. 16, 2008, the contents of which is incorporated by reference herein.

This invention relates to a method for producing grown materials and to the products made by the method. More particularly, this invention relates to methods for producing organic constructions. Still more particularly, this invention relates to methods for producing organic structural cores, wood like materials, and other structural materials.

BACKGROUND OF THE INVENTION

Materials are produced today using a range of processes ranging from time intensive outdoor growth and harvesting to energy intensive factory centric production. As demand for raw goods and materials rise, the associated cost of such materials rises. This places greater pressure on limited raw materials, such as minerals, ores, and fossil fuels, as well as on typical grown materials, such as trees, plants, and animals. Additionally, the production of many homogenous materials and composites produces significant environmental downsides in the form of pollution, energy consumption, and a long post use lifespan.

Conventional materials such as expanded petroleum based foams are not biodegradable and require significant energy inputs to produce in the form of manufacturing equipment, heat and raw energy. Conventionally grown materials, such as trees, crops, and fibrous plants, require sunlight, fertilizers and large tracts of farmable land.

Finally, all of these production processes have associated waste streams, whether they are agriculturally or synthetically based.

Fungi are some of the fastest growing organisms known, with some types, such as *Neospora* sp., growing up to 40 µm/minute. Fungi exhibit excellent bioefficiency, of up to 80%, and are adept at converting raw inputs into a range of components and compositions. Fungi are composed primarily of a cell wall that is constantly being extended at the apex of the hyphae. Unlike the cell wall of a plant, which is composed primarily of cellulose, or the structural component of an animal cell, which relies on collagen, the structural oligosaccharides of the cell wall of fungi rely primarily on chitin and Beta Glucan. Chitin is a strong, hard substance, also found in the exoskeletons of arthropods. Chitin is already used within multiple industries as a purified substance. These uses include: water purification, food additives for stabilization, binders in fabrics and adhesives, surgical thread, and medicinal applications.

Given the rapid growth times of fungi, its hard and strong cellular wall, its high level of bioeffeciency, its ability to utilize multiple nutrients and resource sources, and, in the filamentous types, its rapid extension and exploration of a substrate, materials and composites produced through the growth of fungi can be made more efficiently, cost effectively, and faster than through other growth processes and can also be made more efficiently and cost effectively than many synthetic and organic processes.

Numerous patents and scientific procedures exists for the culturing of fungi for food production, and a few patents detail production methods for fungi with the intent of using its cellular structure for something other than food production. For instance U.S. Pat. No. 5,854,056 discloses a process for the production of "fungal pulp", a raw material that can be used in the production of paper products and textiles.

Accordingly, it is an object of the invention to provide a method for the culturing and fruiting of filamentous fungi specifically for the production of materials and composites composed in part, or entirely of, hyphae and its aggregative form, mycelia and mycelium, when such hyphae are formed into a fruiting body.

It is another object of the invention to provide a material made in part or in whole of cultured fungi.

It is another object of the invention to provide an enclosure for growing composites and materials comprised of fungi fruiting bodies.

It is another object of the invention to provide a mixture of particles for use in the growing of filamentous fungi to produce a homogenous or heterogeneous material.

Briefly, the invention provides a method for producing grown materials and, in particular, provides a method of using the growth of an organism to produce materials and composites.

In accordance with the invention, a fungus is cultured for the production of a material using the vegetative phase of the fungus, mycelium. This fungus is typically a Basidiomycete.

Basidiomycetes are a phylum of fungi that create a fruiting body (mushroom) to produce spores as a method of sexual reproduction. These fruiting bodies are diverse and take specific forms based on environmental, chemical, and physical stimuli from the substrata/environment from which the fungus is grown.

In this disclosure we describe a series of processes that allow fruiting bodies to be rapidly grown into a low density, chitinous material that can replace balsa, bass, other woods, and also many foamed plastics.

Growing a tree requires 7 to 8 years of favorable outdoor environmental conditions, while our fungal material can be grown in as little as 3 weeks from initial substrate inoculation to final product[1]. The fruiting body, from which the structural material is derived, can be grown to near net shape by encapsulating the fungal primordium in an enclosure of the desired form which controls the microclimate. By growing the fungal fruiting body to a desired shape only minor post processing is required, reducing waste. Controlling the microclimate around the fruiting body allows precise modification of the fruiting bodies morphology including pileus[2] to stipe[3] length, pileus and stipe shape, diameter, thickness, density, surface finish, fiber orientation, color, length, and width. Additionally, fruiting bodies, either formed using an enclosure or by other means, can be post-processed to desired material dimensions including shapes such as blocks, cylinders, sheets, spheres, and other combinations of three dimensional solids. Manufacturing processes that may be employed during post processing include, but are not limited to, machining, forming, pressing, drying, sanding, cutting, milling, turning, burning, heating, drying, cooling, water jet cutting and drilling.

[1] Regarding *G. lucidum*. Growth of Fruitbody Formation on *G. lucidum* on Media Supplemented with Vanadium, Selenium, and Germanium. Tham, L; et al. 1998
[2] A pileus is the mushroom cap that contains either spore tubes or gills, pl. plieuses
[3] A stipe is the mushroom stalk Although the majority of Basidiomycetes and some macro Ascomycetes are applicable for creating structural materials utilizing fungi tissue, the order of Polyporales was selected particularly for its production of structural spore tubes, pilei, and stipe that exhibit rigid or plastic material properties as well as a excellent strength characteristics at a range of densisites.

The spore tubes located on the pilei form a honeycomb structure that is comprised of individual, hollow columns that form a network of cylinders that is compressible laterally but stiff along the longitudinal axis, this is present in species *Fomes fomentarius* and *Ganoderma appalantum* for example. The genus *Polyporus* has thus far yielded the best pileus and stipe for composing a solid material with no spore tubes or cylindrical voids; these include: *P. squamosus, P. avleolaris, Fomes. fomentarius*, and *I. obliquus*.

Density calculations of solid sections of formed and processed fruiting bodies have yielded a higher density for stipe (stalk) fibers of up to 350 kg/m$^3$, while the pelius (cap) had a mean density of 180 kg/m$^3$. Spore tube densities on formed and processed sections of *G. appalantum* and *F. fomentarius* are 390 kg/m$^3$ and 340 kg/m$^3$ respectively. These densities are comparable to the bulk densities of marine balsa wood, which ranges from 80 kg/m$^3$ upwards to 350 kg/m^3, and the densities of synthetic plastic foams.

SUMMARY

Method of Forming a Mature Fungal Fruiting Body

To convert any fungal fruiting body, new or seasoned[4], into a board or shape conventional manufacturing processes, as described above, can be used.

[4] Seasoned refers to the process wherein a fruiting body is dehydrated over a period of time either through low temperature (32 degrees F.-100 degrees F.) desiccation or in a high temperature (100 degrees F. through 1000 degrees F.) drying process.

After the fruiting body has been harvested and dried, its shape can be modified again by increasing moisture, such as submersing the fruiting body in water or exposing it to variations such as steam. Re-introducing moisture into the fruiting body will change the material characteristics, typically making the material flexible and therefore easier to mechanically form into a near net shape. Further chemical treatments, including saturation in acetic acid, can help strengthen the fungus's cellular structure to resist load and stress. Similarly when the material is immersed in an amino sugar solution, such as glycerol, the plasticity obtained when saturated is retained. Under tensile loading it has been discovered that a 10 times reduction in stiffness is achieved when the material contains 10% water by weight. Once a desired form is obtained the fungal fruit can be dried to extract the embodied water content and significantly reduce the weight. Fruiting bodies can also be formed when fresh, and then dried. The remanence of a lamella or pore structure, is also typically removed leaving the underlying support material with physical properties similar to low density woods and plastic based foams.

In this embodiment the gill structure and spore tubes are left on the material, if such a surface is desired, for either ascetic or physical reasons. FIG. 1 illustrates the process for forming a harvested fruiting body, with variable inputs based on the state of the fruiting body displayed as vertical lines.

Method of Growing a Fungal Fruiting Body to Form:

A significant reduction in post processing can be accomplished by growing the fungal fruiting body into the desired net or near net shape of the final product. To accomplish this, the following steps are taken. First, fungal primordium are created by exposing mycelium of the desired organism type to the environmental conditions which induce fruiting in that organism type, including but not limited to light exposure, changes in atmospheric gas concentrations and temperature changes. The fungal primordium[5] are enclosed within a specialized mold of a designated shape which represents the near net shape volume of the desired final product. The enclosure or mold is firmly mounted to the substrata around one or more primorda to prevent motion during fruiting body growth and one or more ends of the enclosure is provided with an orifice that allows gas and/or light to pass. Multiple orifices can be used to produce unique net or near net shapes.

[5] (the first stage in fruiting body formation that extrudes from the substrata)

The morphology of the fruiting body is modified in part by varying the incident light intensity and wavelength. Basidiomycetes and Ascomycetes are phototropic, requiring light to activate primordia maturation. Modifying light intensity, duration, incident area and application point along substrate will directly influence the number of primordia and starting morphology of said primordia. In the following examples the frequency band for inducing primordium formation was between blue and ultraviolet, 380-720 nm[6].

[6] Fungal Biology. Deacon, J.

One process used to create usable materials out of fruiting bodies is to form "Dark Stipes" or elongated stalks by growing the fruiting body in the absence of light. Light may be used to initiate pinning or primordium formation, the intensity of said light is then completely or significantly reduced, to grow the fungal primordium into a dark stipe.

Specially designed enclosures can also be used to induce the creation of "Super Dark Stipes" that are as long, or longer, than those that might occur in nature, and are grown by creating a conduit whose orifices are either illuminated, aerated, hydrated or any combination of the aforementioned environmental changes. Modifying these environmental conditions causes the fungi to grow a dark stipe along the length of the conduit taking on the approximate dimensions of the conduit.

By controlling the wavelength or wavelengths of light exposure on fungi primordium, as well as the frequency of light exposure, intensity of said light, angle of incidence of said light, and the diffusion of said light, the overall shape or morphology of the fungi fruiting body can be controlled. Relevant morphological changes include: Changing the shape of the stem of the fruiting body, examples include: elongating the stem, producing a thicker stem, producing a thinner stem shortening the stem, Increasing the rate of pinning, or production of fungi primordium, which as had a direct influence on the total number of final fruiting bodies and the respective sizes of said fruiting bodies.

Controlling the light environment can also influence the shape of the cap of the fruiting body, examples include:

Producing a thicker or thinner cap, producing a cap with a larger diameter, producing a cap with smaller diameter, producing a cap with a convex shape, producing a cap with a concave shape.

Additionally, controlling the fungi's exposure to CO2 and other atmospheric gasses will change the morphology and structure of a fungi's fruiting body. An increase of the $CO_2(g)$ concentration within the fungus's environment has shown to cause stipe elongation and pileus reduction in species such as *Agaricus. bisporus, Corprinus. inereus*. Exceptions include Polypores (opposed to Agarics), and *P. mylittae*. Typically an optimal CO2 concentration for mycelium colonization is 5000 ppm and pinning is induced between 340-1000 ppm.

By controlling the exposure to varying $CO_2(g)$ and $O_2(g)$ concentrations, in addition to controlling other physical environmental constraints, such as light type and wavelength, the overall shape and morphology of the fungi's fruiting body can be controlled. Relevant morphological changes related to controlling $CO_2(g)$ and $O_2(g)$ include:

Changing the shape of the stipe of the fruiting body, examples include: elongating the stipe, producing a thicker stipe, producing a thinner stipe, shortening the stipe, Increasing the rate of pinning, or production of fungi primordium, which has a direct influence on the total number of final fruiting bodies and the respective sizes of said fruiting bodies.

Controlling $CO_2(g)$ and $O_2(g)$ concentrations in the growth enclosure will also influence the shape of the pileus of the fruiting body, examples include: producing a thicker or thinner cap, producing a pileus with a larger diameter, producing, a pileus with smaller diameter, producing a pileus with a convex shape, producing a, pileus with a concave shape, Changing the overall size of the fruiting body, producing larger fruiting bodies, producing smaller fruiting bodies, Changing the physical structure of the fruiting body, increasing the packing or density of mycelium within the pileus or stipe, decreasing the packing or density of mycelium within the pileus or stipe, changing the branch rate of mycelium within the pileus or stipe, changing the density of the pileus or stipe, changing the chemical composition of the pileus or stipe, changing the orientation of mycelium within the fruiting body, changing the type of mycelia structure within the fruiting body, modifying the ratio between structural, binding, and generative hyphae Changing the temperature in the area surrounding the fruiting body and the substrate will also influence the morphological structure of the fruiting body. In regards to mesophillic basidiomycetes, temperature decreases below 24° C. accelerate the fruiting body growth, and may also cause any of the morphological changes listed above.

Changing the temperature within the enclosure and/or along a gradient about the length of an enclosure can also be used to alter the rate of growth (stipe, pileus) and general size (stipe, pileus).

Controlling the relative humidity in the area surrounding the fruiting body can be used to influence growth speed, and also spore dispersion. Spores will not be released if the basidia are saturated, thus a high ambient humidity (RH of 85-90%) is used when growing and forming fruiting bodies to prevent spore emission.

Additionally, autolysis, or self digestion, occurs if spores are not released and allows for further mycelium growth along and around the fruiting body. This mycelium can be used to build upon the existing fruiting body, strengthening it and allowing it to be grown into additional fruiting bodies through thigmotropism.

Fruiting body size has a proportional relationship to the size of the substrata. Changing the size of the substrate and number of induced fruiting bodies can be used to control the overall size of the final fruiting bodies.

By using chemical and physical signaling, two fruiting bodies from a growing substrate may be grown into a single monolithic fruiting body increasing the total area and volume of continuous material that may be produced, an essential process to create product sizes suitable for commercial viability. Physical signals include inducing autolysis by elevated moisture content when two fruiting bodies are in direct physical contact. Physically cutting two fruiting bodies to expose internal mycelia and then placing these cuts in contact using any of the standard grafting procedures used for plant and tree propagation, such as planar unions, angled planer unions, jointed unions, and the like may be used. Fruiting bodies can be also mechanical forced into contact, either as post process after they have been grown out, or by growing multiple fruiting bodies in close proximity to each other such that when they expand they intersect their neighbors creating a single mass of tissue. The bonding occurs between like fungal strains and has been defined as either a thigmotropic or zygotropic relation depending on heterothallic or homothallic relation. Physical bonding can also be induced by sanding the surface of the fruiting bodies to a depth of 0.1-10 mm and then placing the resulting faces in physical contact. Chemical signals may also be used to induce fruiting body unions. These include enzymatic signaling, protein signaling, and other signaling achieved through molecules.

In this invention, the enclosure that surrounds the primorda controls the above listed conditions either actively or passively. Aggregates or particles may be placed in the path of the growing fruiting body, becoming embedded within the material during the growth process to change the product's physical properties.

To produce a shaped fruiting body the following steps are taken:
1) A substrate capable of supporting growth of the desired fungal specie is created and inoculated with said specie.
2) Said substrate is incubated at environmental conditions optimal for the mycelia of said fungal specie to fully colonize the substrate and mature to such a point as to support fruiting body growth.
3) Pinning is induced in said substrate through any methods suitable for inducing pinning in said species.
4) One or more of the resulting primordium are then enclosed in a mold which represents the net shape of the desired final product.
    1) Alternately, portions of the surface area of the substrate can be enclosed in a mold and then pinning can be induced.
5) The primordium or primordia are then grown to fill some or all of the mold creating a mass of fungal tissue equivalent in shape to the volume enclosed by the mold.
6) After the tissue has been grown to a density and consistency suitable for the desired application, the fungal tissue is removed from the mold and dried.

Alternately, the following steps may be used to produce a formed fruiting body which is comprised of multiple primordial:
1) A substrate capable of supporting growth of the desired fungal specie is created and inoculated with said specie.
2) Said substrate is incubated at environmental conditions optimal for the mycelia of said fungal specie to fully colonize the substrate and mature to such a point as to support fruiting body growth.
3) Pinning is induced in said substrate through any methods suitable for inducing pinning in said species.
    1) Alternately portions of the surface area of the substrate can be enclosed in a mold and then pinning can be induced.
4) Multiple primordia are then enclosed in a single mold which represents the net shape of the desired final product.
5) The multiple primordia are then grown so as to intersect adjacent primordia and to fill some or all of the mold creating a monolithic mass of fungal tissue equivalent in shape to the volume enclosed by the mold.
6) After the tissue has been grown to a density and consistency suitable for the desired application the fungal tissue is removed from the mold and dried.

These steps differ from those undertaken through conventional mushroom cultivation in that in conventional mushroom cultivation, cultivators are taught not to place any form of containment or other vessel around the growing basidiocarp. Additionally, the method described above will typically lead to the creation of an elongated stipe, and delayed or non-formation of the pileus typically also blocking production of hymenophore. Furthermore, when multiple primordia are enclosed within a single mold, and proper environmental conditions are observed, the resulting stipe or pileus tissue will fuse into a single monolithic fruiting body, a characteristic undesirable in conventional mushroom production. Finally, the act of growing a fruiting body into a near net shape other than that typically taken on by a mushroom is at odds with the goals of conventional cultivation which prize and benchmark against the natural morphological structure of fruiting bodies as seen in nature. In fact, defective fruiting bodies are often identified by their non-conformity to this morphology.

Additionally, the static embodiments of this material, typically used as a self supporting structural material, is at odds with the conventional use of fungal tissue as a food source for humans or animals. Additionally, the static embodiment of fungal tissue resulting from any of the processes described above has characteristics different from those found in conventionally grown mushrooms. These characteristics include a distinct shape, controlled by the mold in which the fruiting body was grown. These characteristics also include fungal tissue configurations which are not seen in natural growth, including elongated stipes, and pilei formed into non-optimal spore producing configurations. These characteristics also include fungal tissue configurations which would not typically be seen in conventional cultivation or nature, such as thigmotropic response along a significant portion of fungal fruiting bodies surface area. The surfaces of fungal fruiting bodies may also differ from those found in nature, becoming smoother and more homogenous when in contact with the mold.

Our method differs from other methods focussed on harnessing mycelia products, such as U.S. Pat. No. 5,854,056, because it leverages the fungi's ability to self assemble its modular cells into complex self supporting 3-D structure. This results in self supporting mycelia structures with have a controlled 3-D shape. For instance, in the '056 patent, mycelia is cultured in liquid vats and grown into a thin sheet. In this embodiment, the mycelia partially takes on the dimensions of the trough of which it is grown in, but only in a 2-D space, as the thickness of the mycelia sheet is not controlled and nominally thin enough to be referred to as a sheet and not a 3-D solid. Additionally, while the '056 patent does make reference to the mycelia balls intermeshing when growing into a sheet, the final product is not treated as a self supporting, rather being referred to, and used as, pulp. In our embodiments, this mycelia tissue is allowed to self assemble under the environmental conditions which produce dense strong tissue, such as the tissue type which is found in a fruiting bodies stipe in nature. Furthermore, the mycelia tissue contemplated in our embodiments is formed into a 3-d structure with dimensions controlled along each of the shapes surfaces. Finally, in our process the final product is a self supporting 3-d structure, in the patent '056, the fungal mass must be ground, combined with paper pulp, and then pressed, to result in a self supporting structure.

These and other objects and advantages of the invention will become more apparent taken in conjunction with the accompanying drawings wherein.

EXAMPLE 1

Grown Fruiting Body

*Pleurotus Ostreatus* was cultured on a rye grain substrate for 21 days. This substrate was comprised of 75% rye grain and 24% perlite by dry weight. The substrate was buffered with 1% gypsum by weight and contained 63% water by weight. Rye Grain was obtained from The Honest Weight food CO-OP in Albany, N.Y. Perlite and gypsum were obtained from The Home Depot, located in Latham, N.Y. City water, from the municipality of Troy, N.Y., with a pH of 7, was used to wet the material. The grain, perlite, gypsum, and water were combined together in a 1.5 gallon opaque autoclavable bag obtained from Fungi Perfecti and manually shook for 3 minutes to fully mix the materials. They were than autoclaved for 1 hour at 15 PSI and allowed 24 hours to cool to room temperature. These bags were then inoculated using a liquid culture of *Pleurotus ostreatus* cells. The liquid culture of *Pleurotus ostreatus* cells was contained in a 4 L Erlenmeyer Flask and was composed of 7.5 g of ground cottonseed hulls from Planters Cotton Mill, Ak., 3 g of the aforementioned gypsum, 60 g of Barely Malt Sugar from Barry Farms, 3 g of nutritional yeast, and 1.5 L of municipal water. Along with an Eberbach blender containing 750 mL of municipal water, both were sterilized in an autoclave at 15 psi for 20 minutes. Under hepa-filtered laminar flow, three 60 mm diameter Petri dish cultures of *P. ostreatus* were cut in quarters and applied to the Eberbach blender upon reaching room temperature. The cultures were then blended and applied to the 4 L Erlenmeyer flask. The media with the cell culture was then mixed on a magnetic stir plate for 3 days prior to adding the inoculum to the substrate.

These cells were applied to the autoclaved grain and then the grain bag was sealed and incubated at 75 degrees F. for 21 days. Respiration was achieved through a single filter patch on the top of the bag.

Figure 1:
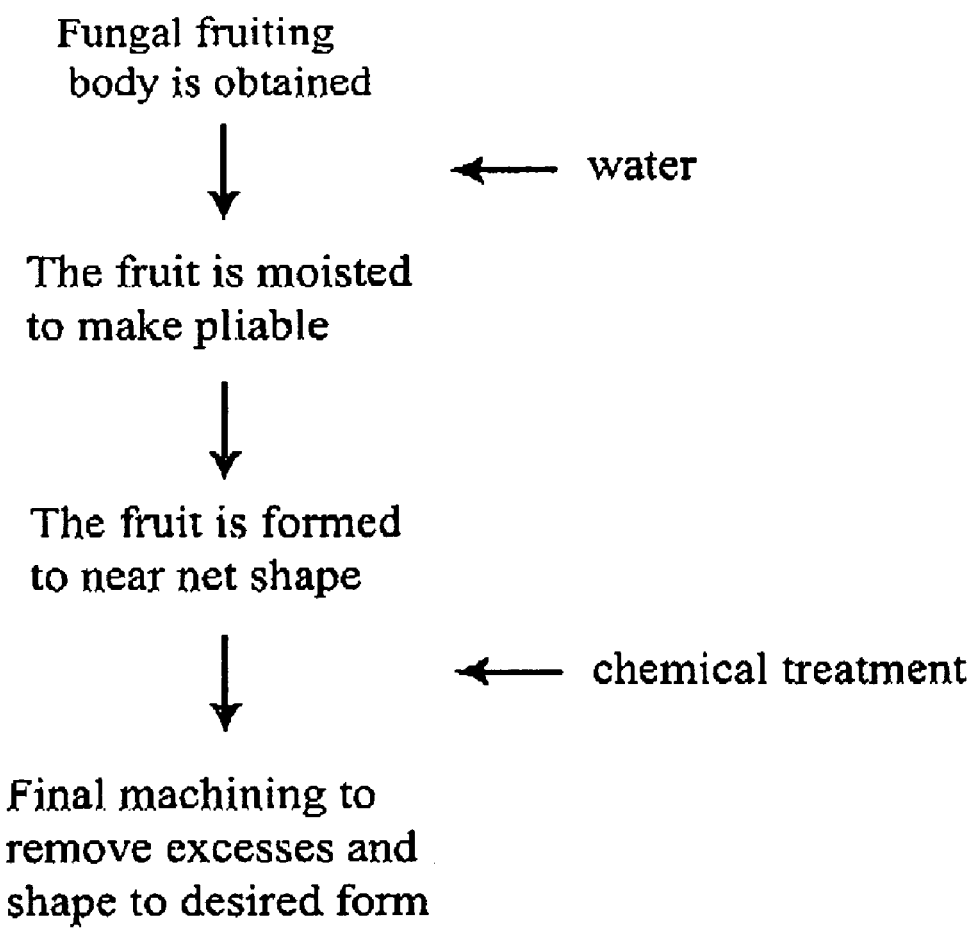
FIG. 1 illustrates a post processing flow diagram in accordance with the invention.
Figure 2:
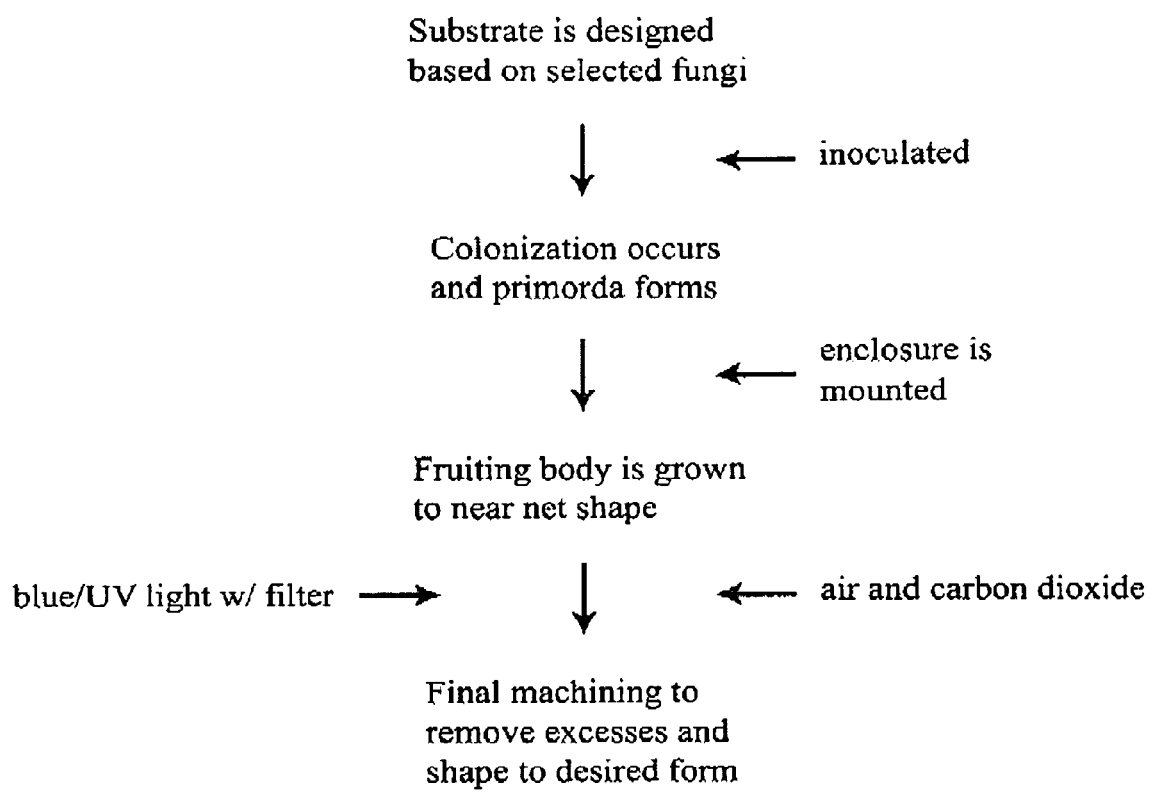
FIG. 2 illustrates a growing to form flow diagram in accordance with the invention.
Figure 3:
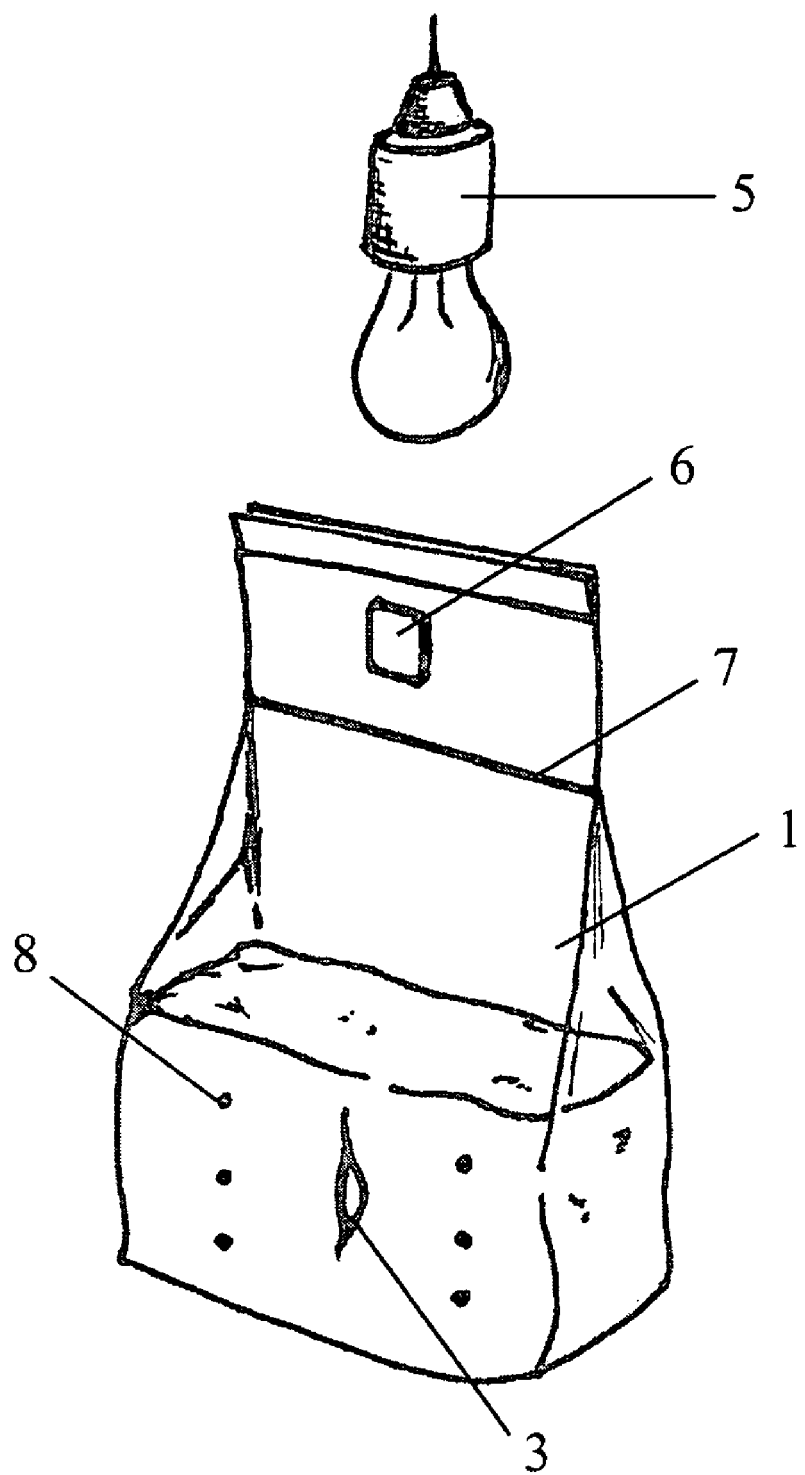
FIG. 3 shows a perspective view of a simplified apparatus for producing formed fungal fruiting bodies in accordance with the invention.
Figure 4:
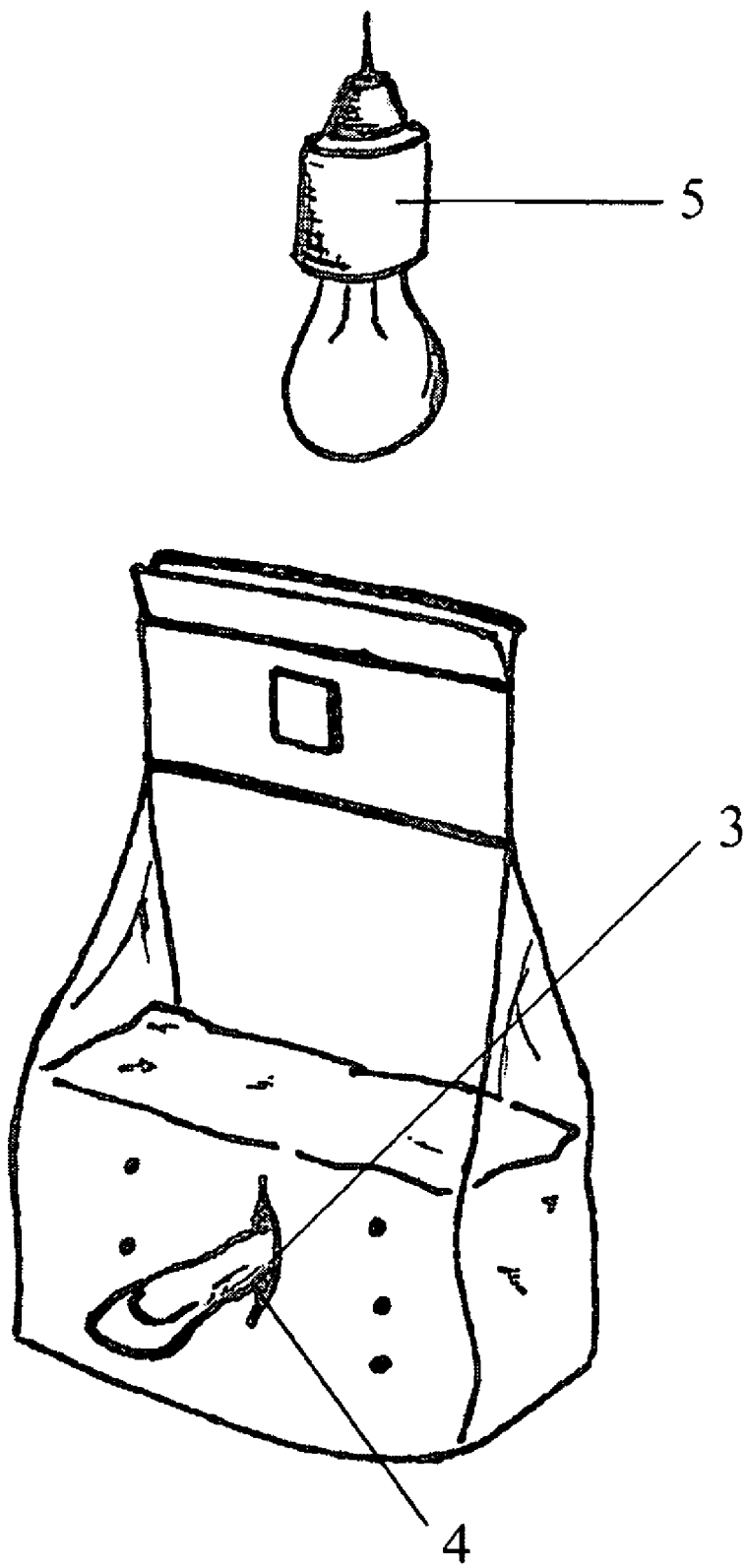
FIG. 4 shows the apparatus from FIG. 3 after several days of fungal fruiting body growth.
Figure 5:
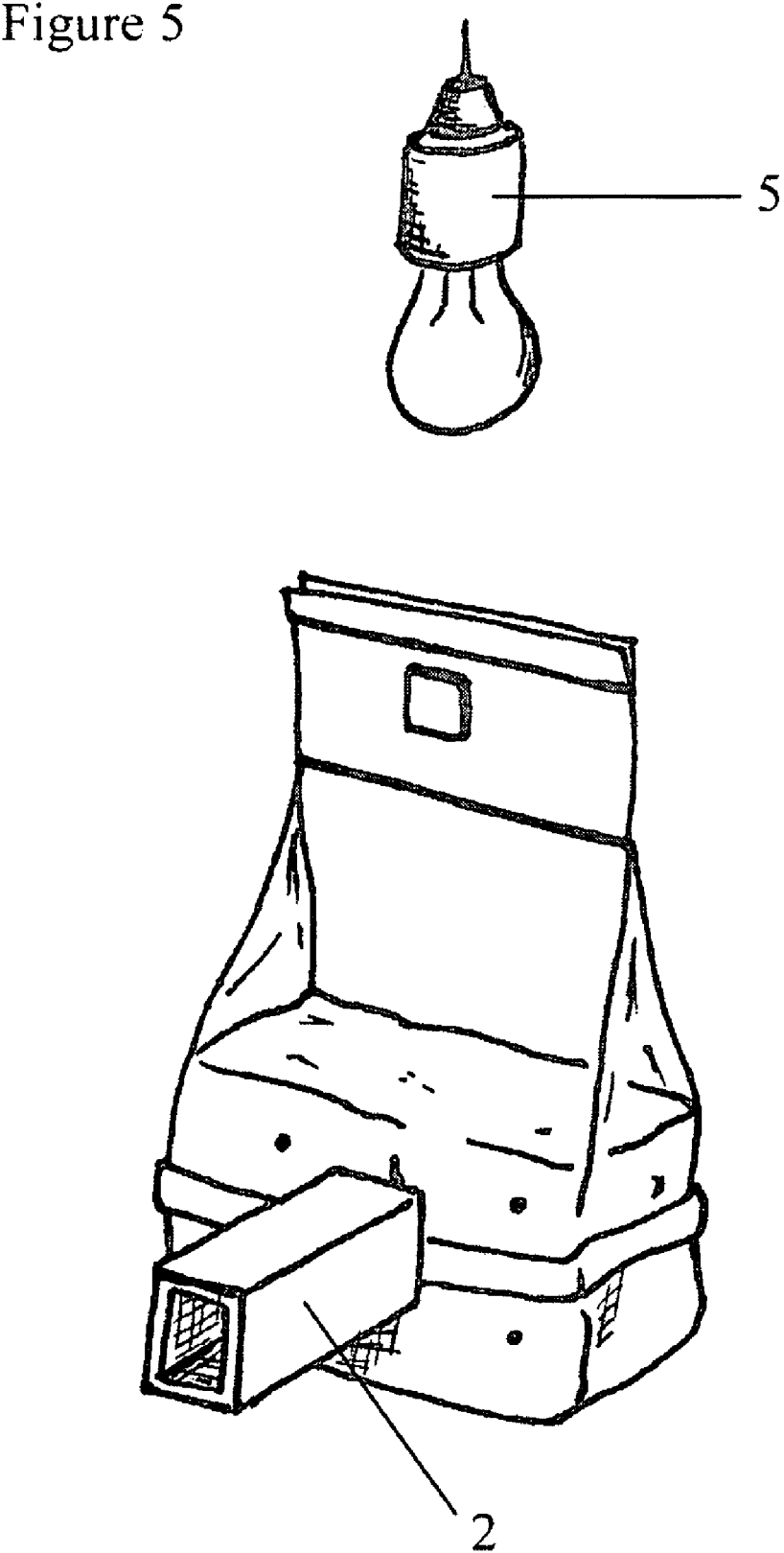
FIG. 5 shows the apparatus from FIG. 3 with a growth enclosure attached.

Referring to FIG. 3, the apparatus is comprised of fully colonized substrate contained in an opaque autoclavable bag 1 with a filter patch 6 which allowed respiration during substrate colonization. A conduit 2 is affixed to the surface of bag 1, as shown in FIG. 5. Bag 1 has been resealed at a seal line 7 below filter patch 6 to prevent any additional air exchange through the filter patch 6. An orifice 3 has been created near the mid-point of bag 1. The orifice has a profile identical to that of conduit 2, pictured in FIG. 5, but with an area half the size of the profile area of conduit 2. The orifice allows atmospheric gasses, primarily $CO_2$ and $O_2$ to reach the substrate, in addition to light, which induces the creation of a primordium 4 only at orifice 3, as shown in FIG. 4. The opaque nature of the bag, and the lack of any other atmospheric gas exposure points, assures that primorida are only created at specifically selected orifice/conduit junctions.

FIG. 4 shows primordium 4, whose creation was induced through exposure to photons from blue light source 5, as pictured in FIG. 3, which was positioned one meter from orifice 3. Blue light source 5 produced photons at a energy output of 500 lumens which in addition to the exposure to atmospheric gasses through orifice 3, which had a $CO_2$ concentration of between 2000-3000 PPM and a relative humidity of above 50%, resulted in the formation of primordium 4 at a central point within orifice 3. Approximately 48 hours were required from the creation of orifice 3 and the application of light and atmospheric gas to create primordium 4.

Referring to FIG. 5, conduit 2 was attached over orifice 3, pictured in FIG. 3, and primordium 4, pictured in FIG. 4. After primordium 4 was created and covered, the light output from blue light source 5 was modulated over a 7 day period, from 500 lumens to 50 lumens, using a linear rate of decrease. The concentration of $CO_2$ exposed to orifice 3 within conduit 2 was also lowered from a starting concentration of between 2000-3000 PPM to a ending concentration of approximately atmospheric, 350-1000 PPM. Relative humidity was raised to 100% by the end of the 7 day period.

Figure 6:
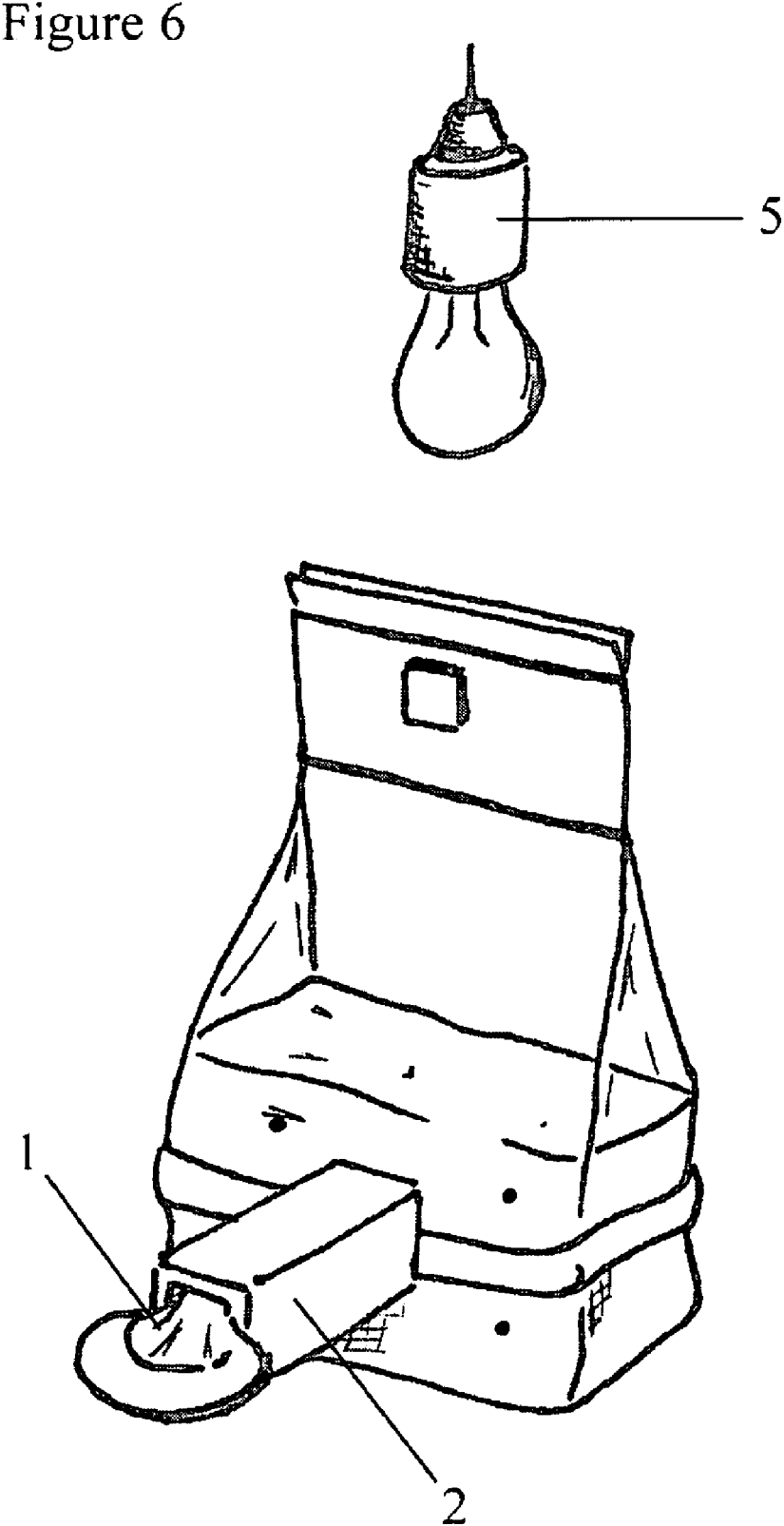
FIG. 6 shows the flexible incubation bag of FIG. 5 after the attachment of an enclosure with a stipe and pileus formed into the enclosure shape.

Referring to FIG. 6, during seven days of fungal fruiting body growth, primordium 4 from FIG. 4 became fruiting body 1, whose stipe diameter expanded to fully fill that of conduit 2 resulting in a planar stipe profile equal to that of the profile of conduit 2. During this seven day period, fruiting body 1 also grew along the entire length of conduit 2 resulting in fruiting body 1 having a total volume equal to the total volume of conduit 2 and a geometric profile equal to the profile of the inner dimensions of conduit 2.

At the end of day seven, fruiting body 1 was cut away from the substrate using a scalpel and removed from the conduit. Fruiting body 1 was then placed in a convection drying oven and dried for 24 hours at 300 degrees F. until moisture content was less than 2%. It was then squared on a table saw to produce a rectangular rod.

EXAMPLE 2

Grown Fruiting Body

Dryad's Saddle (*Polyporus squamosus*) was cultured on a substrate comprised of 75% waste cotton burrs from the USDA located in Lubbock Tex. and 24% cottonseed hulls from Planters Cotton Mill in Arkansas. The substrate was buffered with 1% gypsum and was mixed at a 100% moisture content. The cottonseed hulls and cotton burrs were sterilized by soaking in a 35% hydrogen peroxide solution for 25 minutes. The gypsum, cotton burrs, and cotton seed hulls, were than poured into 5 cubic foot flexible opaque bags with breathable membranes and inoculated using 2 liters of liquid inoculum. Bags were incubated for 45 days at 21 degrees Celsius.

Figure 7:
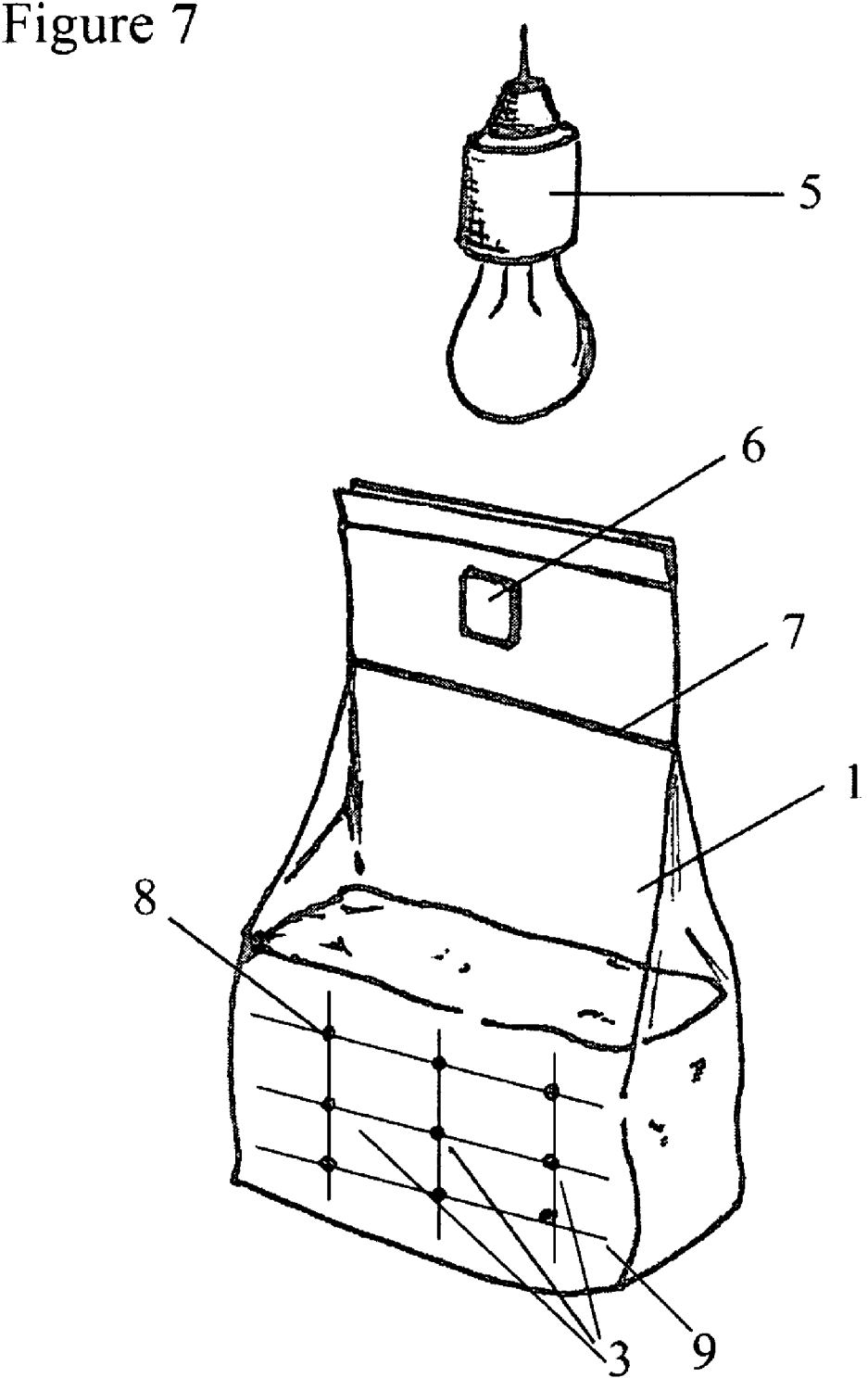
FIG. 7 shows a perspective view of a simplified apparatus for producing formed fungal fruiting bodies in accordance with the invention.

Referring to FIG. 7, small punctures, with a diameter of approximately 0.125" were created every 12" along a 12"×12" grid creating a series of orifices 3 along a set of grid lines 9.

Figure 8:
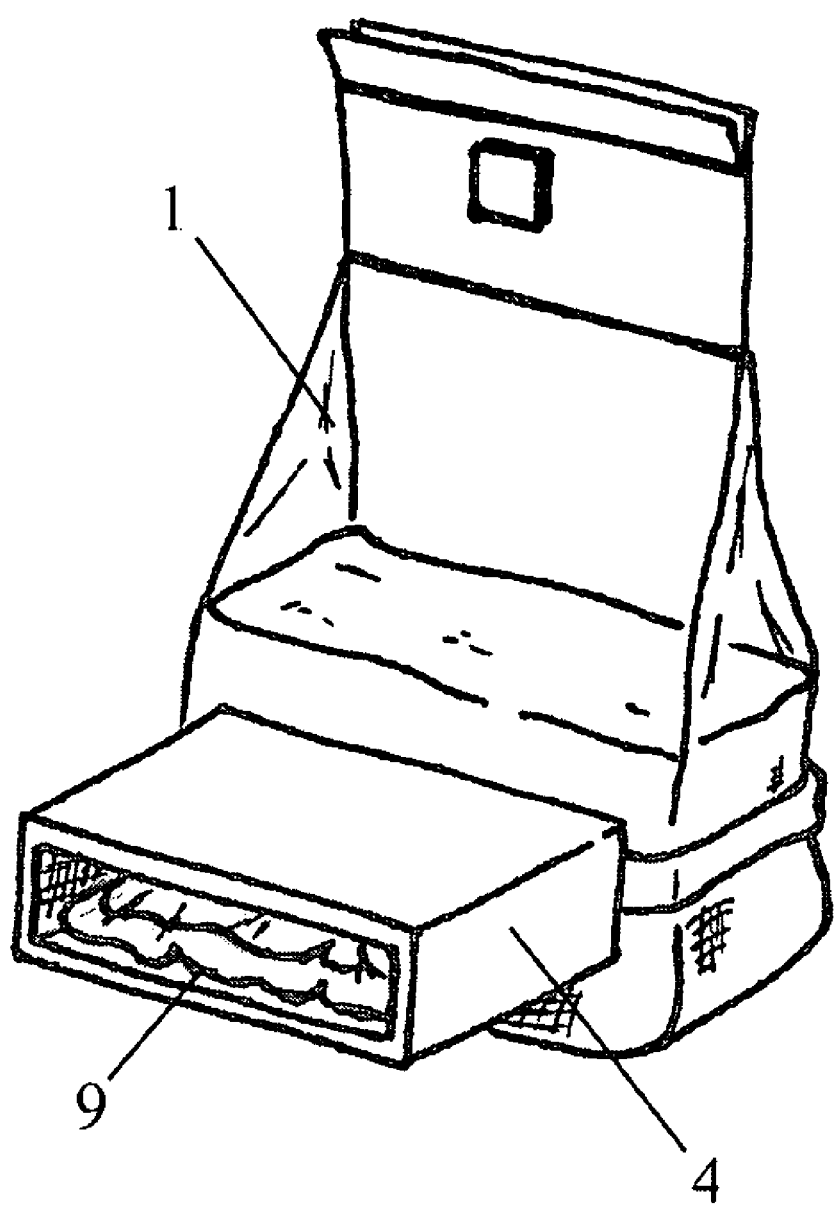
FIG. 8 shows the apparatus from FIG. 7 after several days of fungal fruiting body growth.

Referring to FIG. 8, An enclosure 4, sized 2"×12"×24", was placed over the series of orifices and firmly affixed to the flexible incubation bag 1. Though not pictured, each of the puncture points was covered in a similar enclosure to enclosure 4. Blue light at an intensity of 40 lumens at a distance of one meter from flexible bag 1 was used to initiate creation of the primordium, with additional primordium forming at each puncture site.

These primordium were grown out under additional incident light at a intensity of about 1,000 lumens illuminating an area of about 100 square feet, cycled on/off at 12 hour intervals to encourage primordium 5 to undertake stipe elongation along the width, height and depth of enclosure 4. This light exposure, in addition to exposure to $CO_2$ concentrations of between 1500-3000 PPM encouraged primordia to grow along the 12"×24"×1" rectangular section beginning to fill enclosure 4 with fungal tissue 9.

Figure 9:
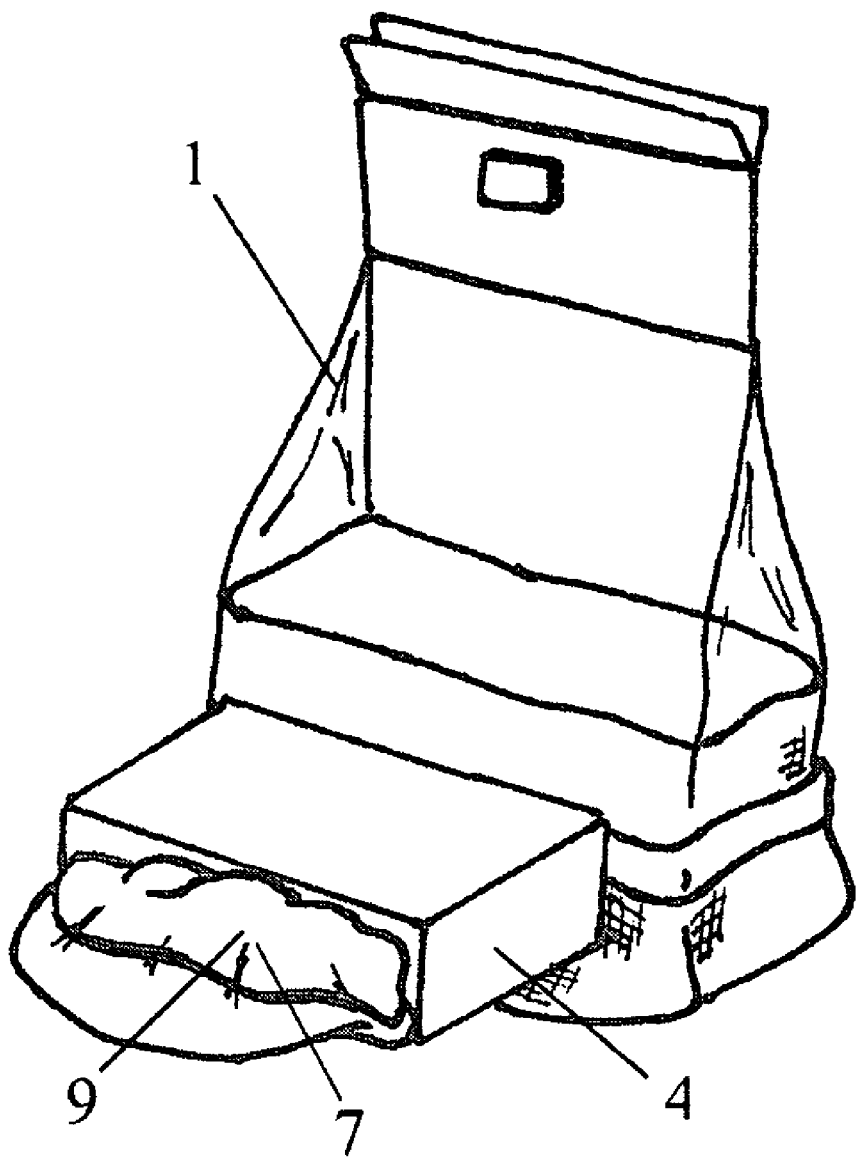
FIG. 9 shows the flexible incubation bag of FIG. 7 with a stipe and pileus formed into the enclosure shape.

FIG. 9 shows flexible incubation bag 1 after 30 additional days of fruiting body growth. Fungal tissue 9 has fully filled enclosure 4 producing a formed fruiting body 7 which has dimensions equal to enclosure 4, approximately 12"×24"×1". At this stage, fruiting body 7 was cut away from flexible bag 1 using a sterile scalpel and slid out of the enclosure 4 by gently tapping on one end of the enclosure 4 while pulling on the fruiting body 7. After removing from the enclosure 4, the fruiting body 7 was dried for 45 minutes in a high capacity convection drying unit at 140 degrees fahrenheit until moisture content was below 7%. The fruiting body was then trued to 11"×21"×0.9" using a saw and sanded to a sheet 10"×20"×0.8", as shown in FIG. 8.

EXAMPLE 3

Grown Fruiting Body

Dryad's Saddle (*P. squamosus*) was cultured on substrate comprised of 75% waste sugar maple sawdust from New Morning Farm in Bethel, Vt. and 24% cottonseed hulls from Planters Cotton Mill in Arkansas. The substrate was buffered with 1% gypsum and was mixed at a 100% moisture content. The cottonseed hulls and cotton burrs were sterilized by autoclaving for 1 hour at 15 PSI. The gypsum, cotton burrs, and cotton seed hulls, were allowed to cool to room temperature, and than poured into 5 cubic foot flexible opaque bags with breathable membranes and inoculated using 2 liters of liquid inoculum. Bags were incubated for 45 days at 21 degrees Celsius.

Figure 10:
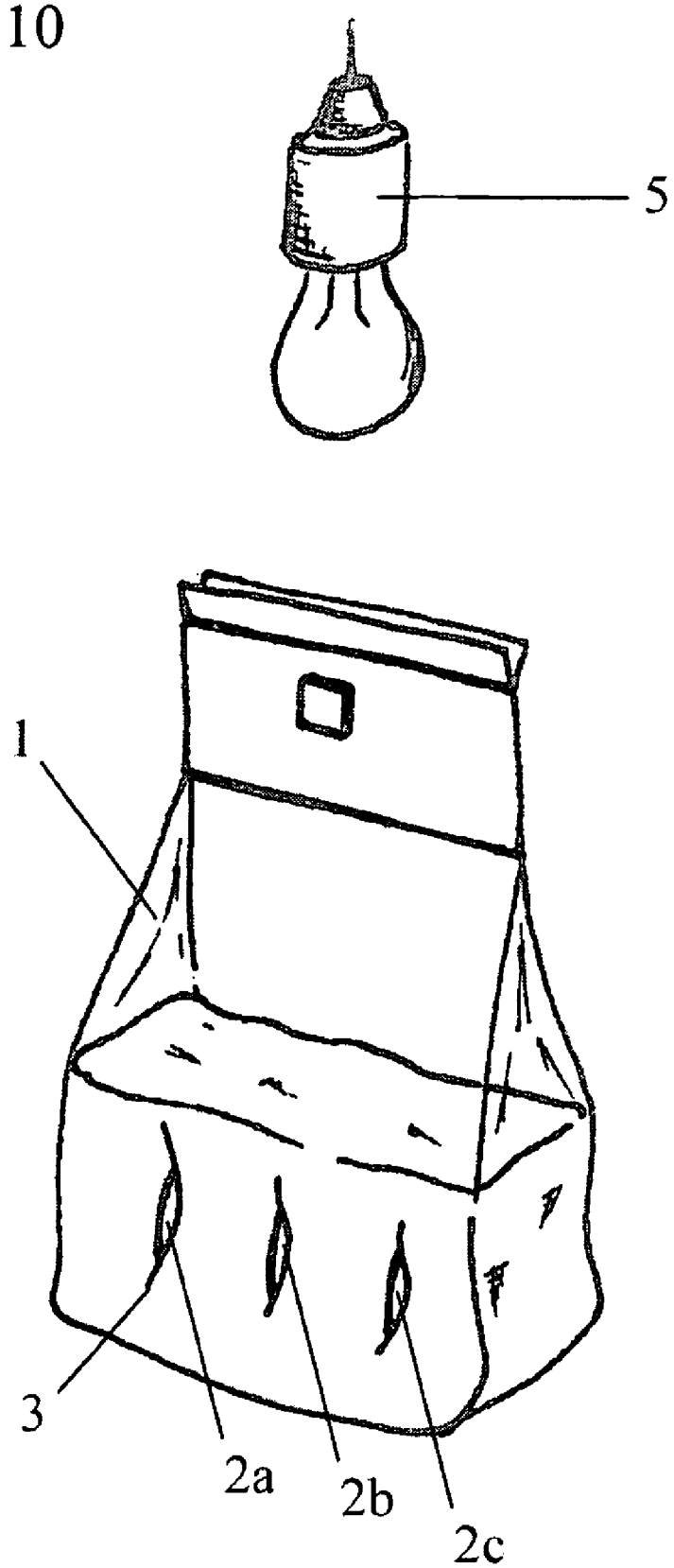
FIG. 10 shows a perspective view of a simplified apparatus for producing formed fungal fruiting bodies in accordance with the invention.

FIG. 10 shows a flexible incubation bag 1 after 45 days of incubation. Small punctures, with a diameter of approximately 0.125" were created every 12" along a 12"×12" grid creating a puncture point 2, a puncture point 2b, and a puncture point 2c, additional puncture points are not pictured.

Figure 11:
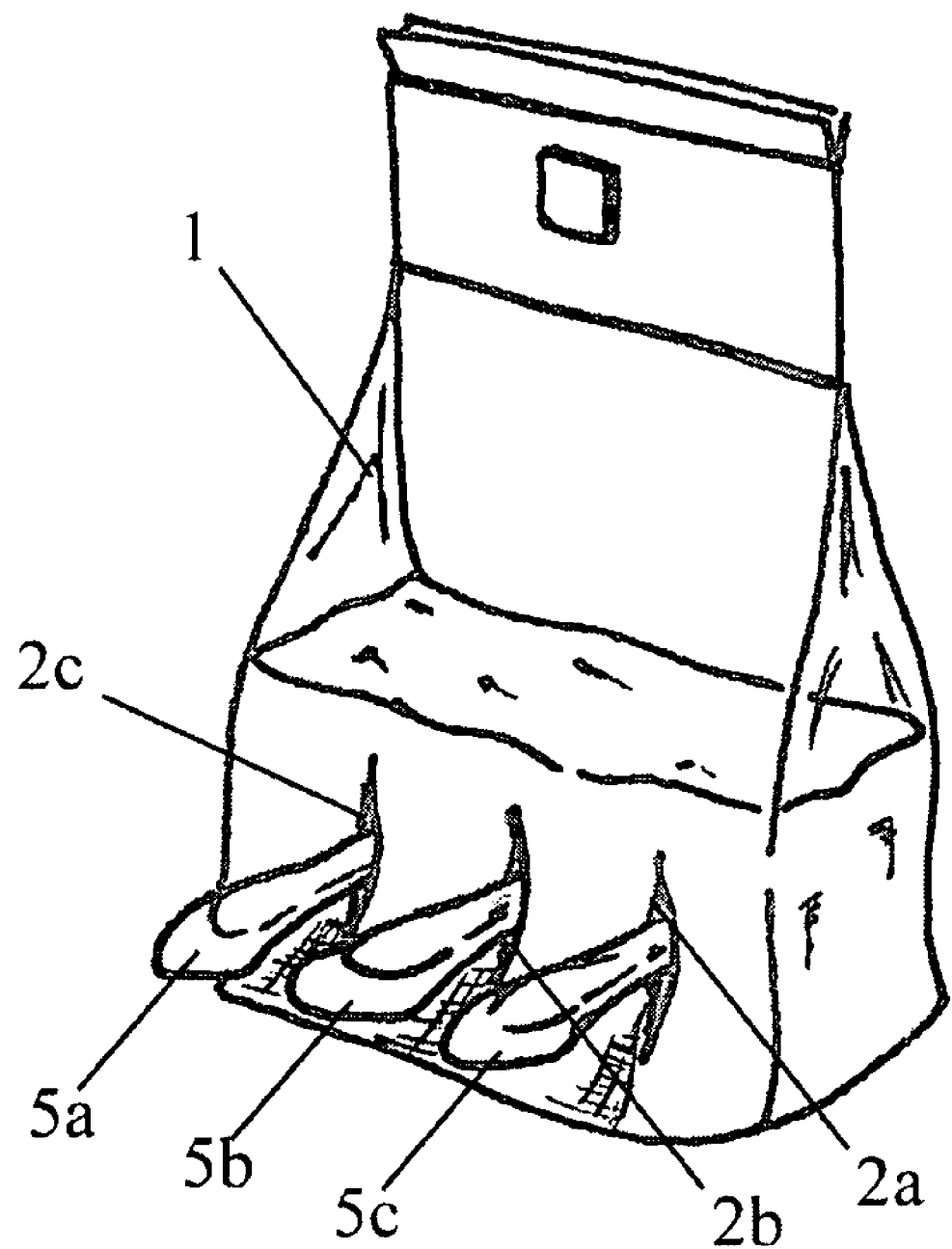
FIG. 11 shows the flexible incubation bag of FIG. 10 after additional fruiting body growth.

FIG. 11 shows a primordium 5, a primordium 5b, and a primordium 5c growing out of puncture point 2, puncture point 2b, and puncture point 2c, respectively. Blue light at an intensity of 40 lumens at a distance of one meter from flexible bag 1 was used to initiate pinning at each puncture site, resulting in the creation of primordium 5, primordium 5b, and primordium 5c.

Figure 12:
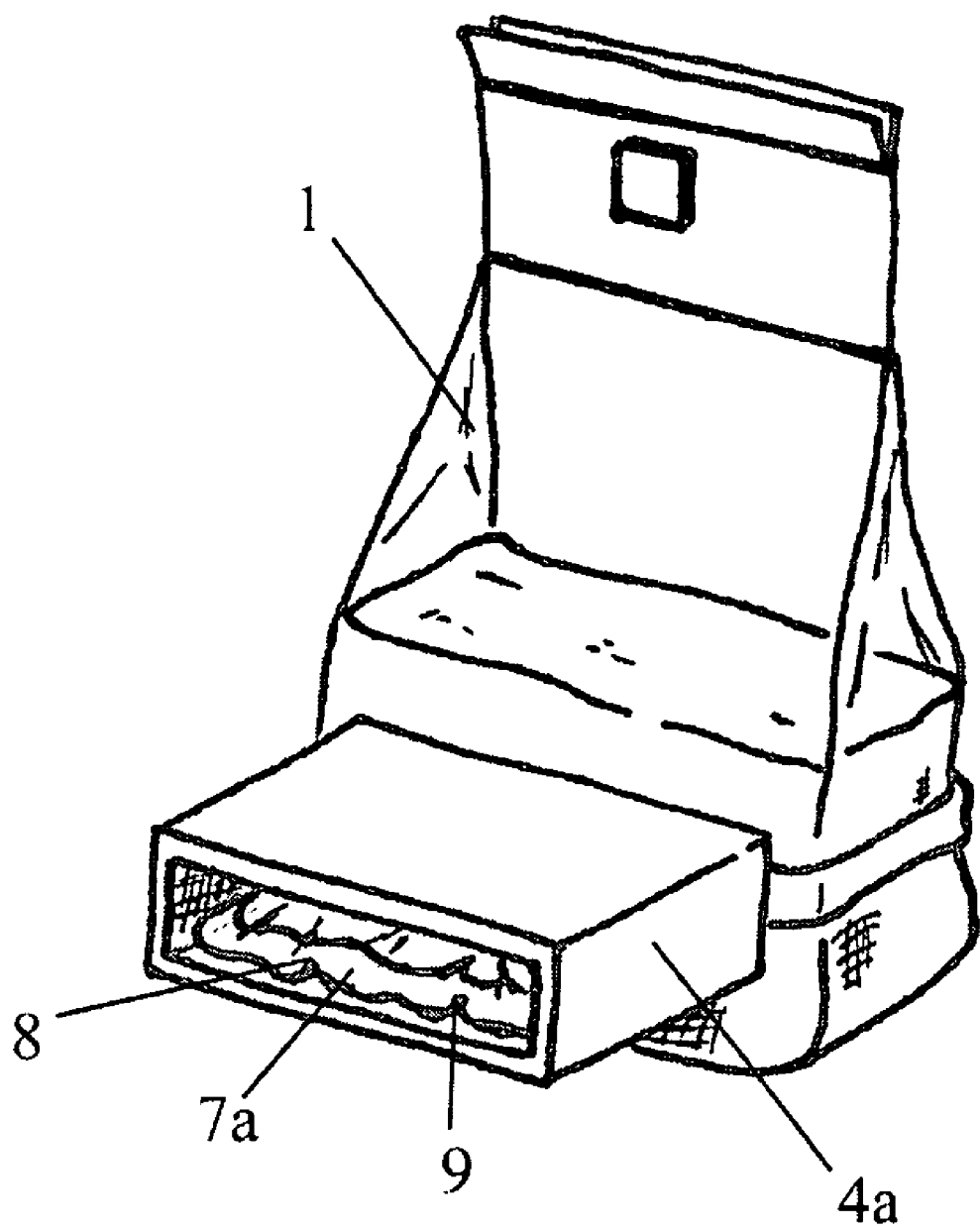
FIG. 12 shows the fruiting body growth of FIG. 10 taking on the form of the enclosure

FIG. 12 shows a flexible incubation bag 1 after twenty nine days of fruiting body growth. An Enclosure 4a has been placed over the puncture points 5, 5a, and 5b and now contains a monolithic fruiting body 7a, which is comprised of primordium 5, primordium 5b, and primordium 5c, which have now formed a union 8 and a union 9 at the intersection of each of their edges. During this twenty nine day period, the Relative Humidity (RH) in the area surrounding the flexible incubation bag 1 and enclosure 4a was held at between 90-100 percent to encourage a thigmotropic response, wherein primordium 5, primordium 5b, and primordium 5c, were able to grow into a single mass of fungal tissue, i.e. a fruiting body 7a. At this stage, fruiting body 7a has taken on the same volume as enclosure 4a, producing a mass of fungal tissue that measures 36"×24"×2".

Additional incident light at a intensity of about 1,000 lumens illuminating an area of about 100 square feet, was cycled on/off at 12 hour intervals to encourage stipe elongation along the width, height and depth of the enclosure 4a. This light exposure, in addition to exposure to CO2 concentrations of between 1500-3000 PPM encouraged primordium 5, primordium 5b, and primordium 5c, to grow along the 36"×24"×2" rectangular section into a monolithic fruiting body 7a.

Figure 13:
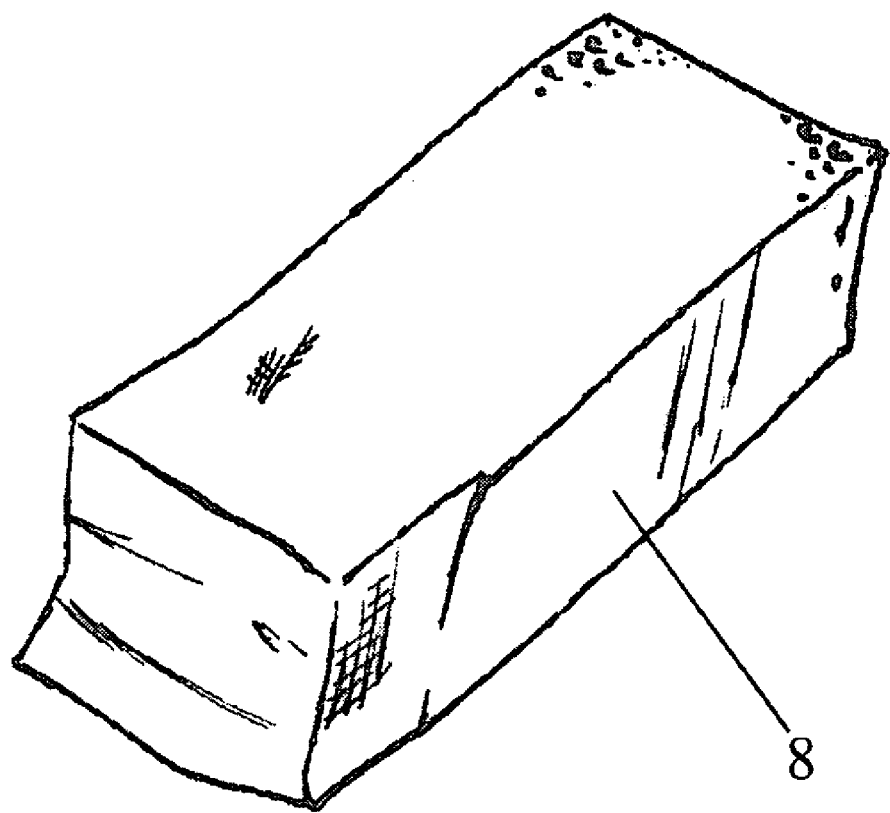
FIG. 13 shows the finished part produced from the enclosure shown in FIG. 12.

At this stage, the fruiting body 7a was cut away from the flexible bag 1 using a sterile scalpel and slid out of the enclosure 4a by gently tapping on one end of the enclosure 4 while pulling on the fruiting body 7a. After removing from the enclosure 4a, the fruiting body 7a was dried for 45 minutes in a high capacity convection drying unit at 140 degrees Fahrenheit until the moisture content was below 7%. The fruiting body was then squared to form a finished fungal part 8 measuring 36"×24"×2" using a table saw, as shown in FIG. 13.

EXAMPLE 4

Static Embodiment Structural Core

Figure 14:
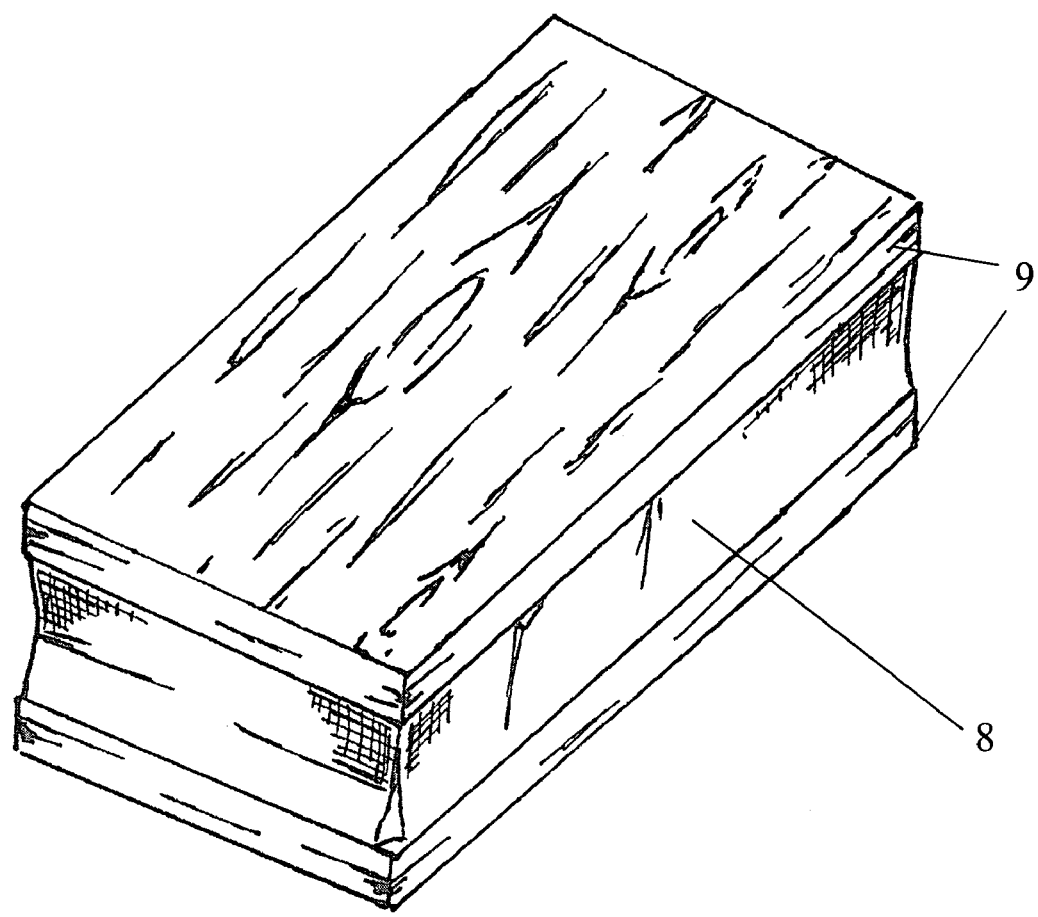
FIG. 14 illustrates a laminated structure in accordance with the invention.

FIG. 14 shows the mass of fungal tissue from example 3, i.e. a finished fungal part 8, laminated between two sheets of a stiff veneer 9 comprised of ⅛" thick plywood purchased from The Home Depot in Latham, N.Y. This laminate construction could then be used as a light weight panel in a vehicle, as a table top, as a blade component in a wind turbine, or as a panel in a boat. Many other uses are possible when utilizing the fungal tissue as a structural core.

EXAMPLE 5

Grown Fruiting Body

Dryad's Saddle (*P. squamosus*) was cultured on a substrate comprised of 75% waste cotton burrs from the USDA located in Lubbock Tex. and 25% cottonseed hulls from Planters Cotton Mill in Arkansas. The substrate was buffered with 1% gypsum and was mixed at 100% moisture content. The cottonseed hulls and cotton burrs were sterilized by soaking in a 35% hydrogen peroxide solution for 25 minutes. The gypsum, cotton burrs, and cotton seed hulls, were than poured into 5 cubic foot flexible opaque bags with breathable membranes and inoculated using 2 liters of liquid inoculum. Bags were incubated for 45 days at 21 degrees celsius.

Figure 15:
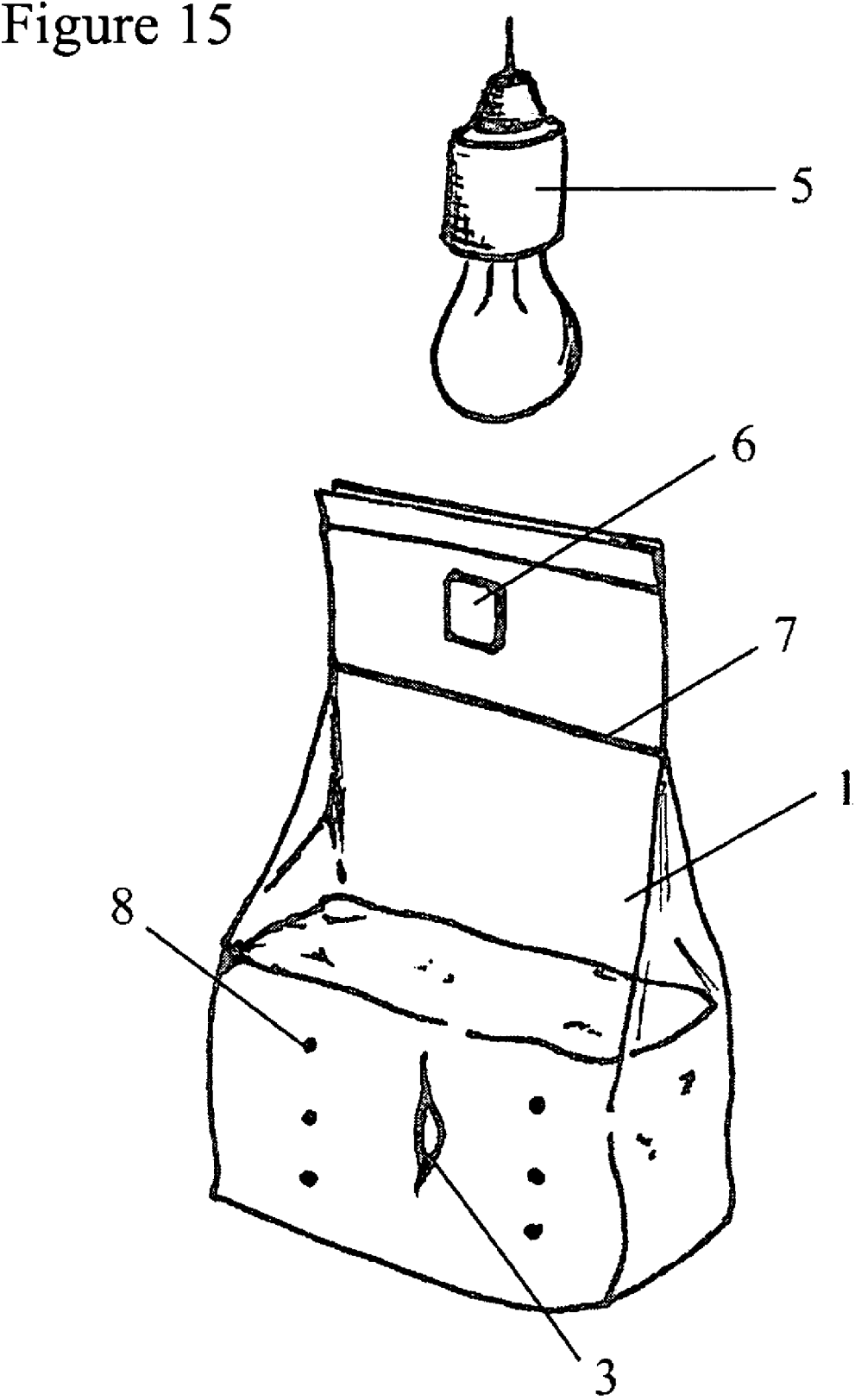
FIG. 15 shows a perspective view of a simplified apparatus for producing formed fungal fruiting bodies in accordance with the invention.

FIG. 15 shows a flexible incubation bag 1 after 21 days of incubation. Small punctures with a diameter of approximately 0.125" were created every 12" along a 12"×12" grid creating an orifice 3.

Figure 16:
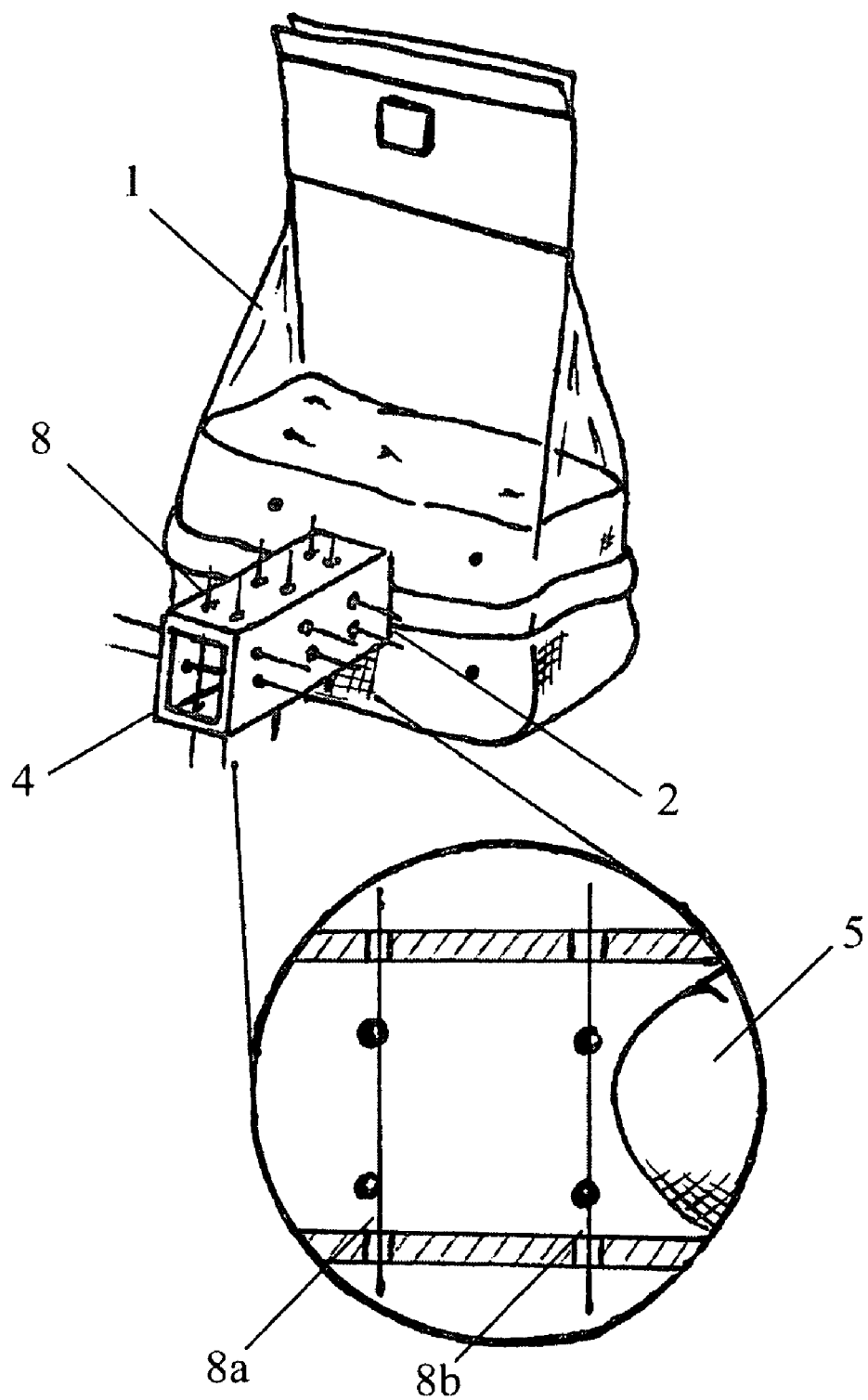
FIG. 16 shows the flexible incubation bag including an enclosure with mesh.

FIG. 16 shows an enclosure 4, sized 2"×12"×24", which was placed over puncture 2 and firmly affixed to flexible incubation bag 1. Though not pictured, each of the puncture points was covered in a similar enclosure to enclosure 4. Blue light at an intensity of 40 lumens at a distance of one meter from flexible bag 1 was used to initiate creation of the primordium 5, with additional primordium forming at each puncture site. A fibrous mesh 8, comprised of cotton fibers arranged in a "10 mesh" configuration was stretched along the length of the enclosure 4 approximately 0.25" inches from the bottom plane. A plurality of fibrous meshes, a fibrous mesh 8a and a fibrous mesh 8b, were placed approximately 0.25" inches and 0.5" inches above fibrous mesh 8.

Additional incident light at an intensity of about 1,000 lumens illuminating an area of about 100 square feet, was cycled on/off at 12 hour intervals to encourage primordium 5 to undertake stipe elongation along the width, height and depth of enclosure 4. This light exposure, in addition to exposure to CO2 concentrations of between 1500-3000 PPM encouraged primordium 5 to begin growing along the 12"×24"×1" rectangular section enveloping fibrous mesh 8, fibrous mesh 8a, and fibrous mesh 8b. Over the next week primordium 5 will fully encase fibrous mesh 8, fibrous mesh 8a, and fibrous mesh 8b and fully take on the geometry of enclosure 4.

Figure 17:
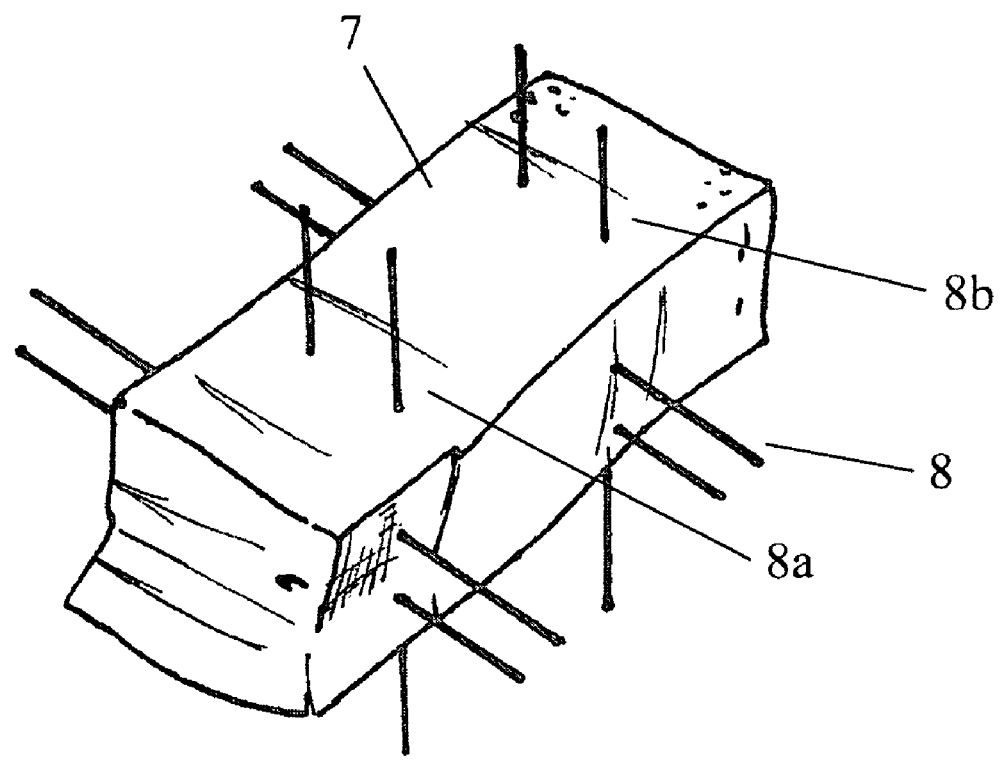
FIG. 17 illustrates a section of material formed from the fruiting body of FIG. 16 including an embedded mesh.

FIG. 17 shows a finished fungal part 7, comprised of the primordium 5 and fibrous meshes 8, 8a, and 8b. Finished fungal part 7 has dimensions equal to the enclosure 4 shown in FIG. 16, approximately 12"×24"×1". Finished fungal part 7 has also incorporated fibrous mesh 8, fibrous mesh 8a, and fibrous mesh 8b into its fungal tissue. This combination of mesh and fungal tissues results in a board with greater tensile strength, among other material properties.

At this stage, the fruiting body 7 was cut away from the flexible bag 1 using a sterile scalpel and slid out of enclosure 4 by gently tapping on one end of the enclosure 4 while pulling on the fruiting body 7. After removing from the enclosure 4, the fruiting body 7 was dried for 45 minutes in a high capacity convection drying unit at 140 degrees fahrenheit until the moisture content was below 7%. The fruiting body was then trued to 11"×21"×0.9" using a saw and sanded to a sheet 10"×20"×0.8".

EXAMPLE 6

Using Multiple Orifices to Product a Fruiting Bodies with Features

Dryad's Saddle (*P. squamosus*) was cultured on a substrate comprised of 75% waste cotton burrs from the USDA located in Lubbock Tex. and 25% cottonseed hulls from Planters Cotton Mill in Arkansas. The substrate was buffered with 1% gypsum and was mixed at a 100% moisture content. The cottonseed hulls and cotton burrs were sterilized by soaking in a 35% hydrogen peroxide solution for 25 minutes. The gypsum, cotton burrs, and cotton seed hulls, were than poured into 5 cubic foot flexible opaque bags with breathable membranes and inoculated using 2 liters of liquid inoculum. Bags were incubated for 45 days at 21 degrees Celsius.

Figure 18:
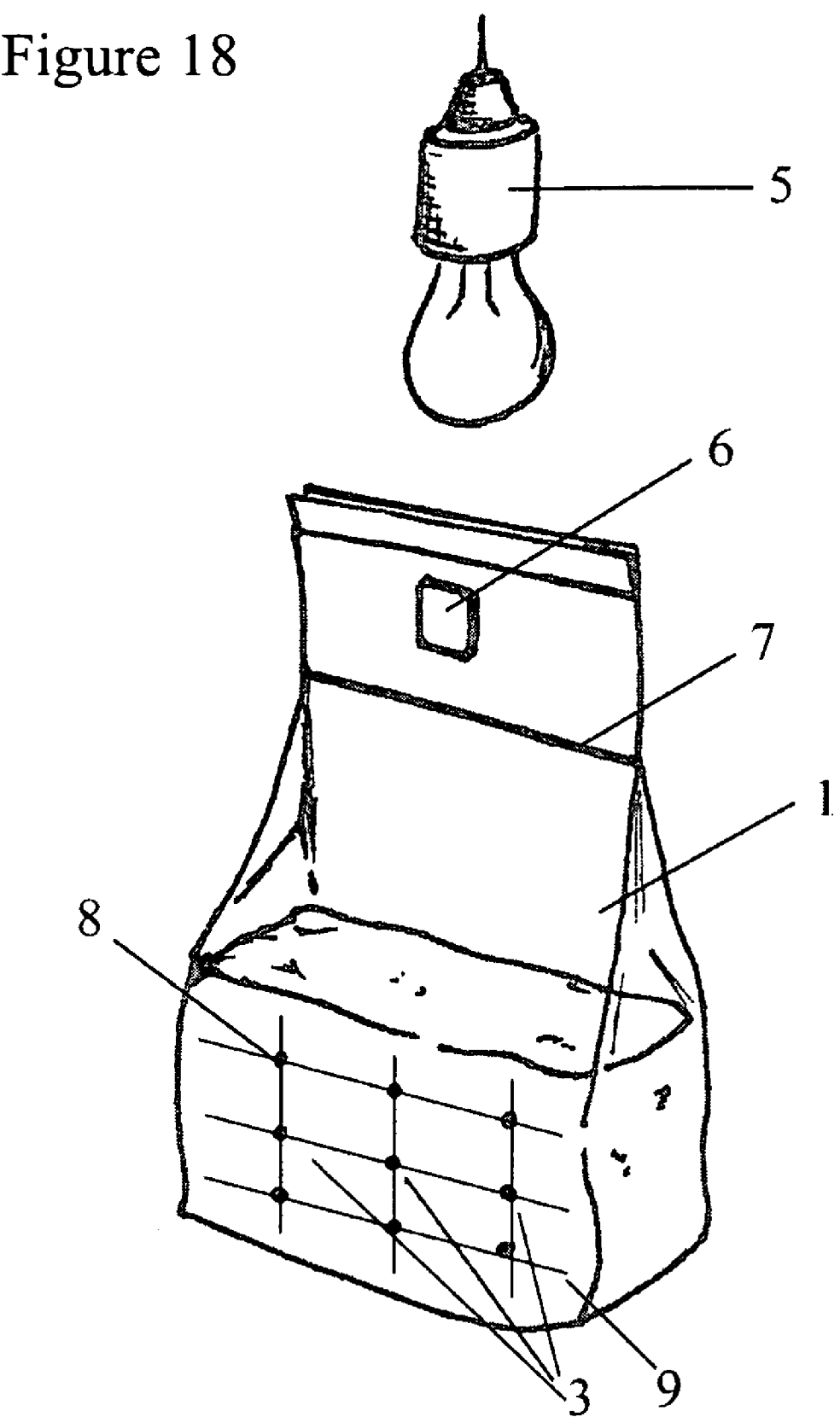
FIG. 18 shows a flexible incubation bag with multiple punctures for processing multiple fruiting bodies in accordance with the invention.

FIG. 18 shows a flexible incubation bag 1 after 21 days of incubation. Small punctures, with a diameter of approximately 0.125"were created every 12" along a 12"×12" grid 9 creating a set of puncture points 3.

Figure 19:
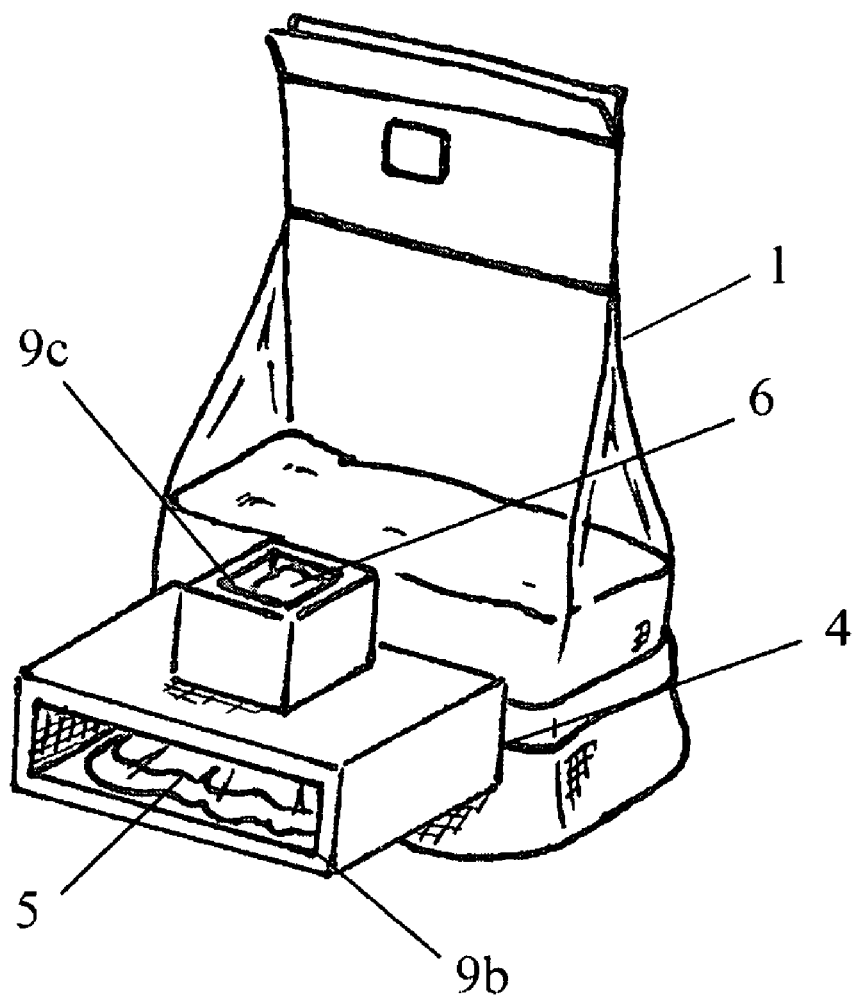
FIG. 19 shows the flexible incubation bag of FIG. 18 after the attachment of a enclosure with multiple orifices.

FIG. 19 shows an enclosure 4, sized 2"×12"×24", was placed over puncture points 3 as shown in FIG. 18, and firmly affixed to flexible incubation bag 1. The enclosure 4 includes three orifices. An orifice 9, which is pressed against puncture points 3, a orifice 9b that is open to the controlled growth environment, and an orifice 9c which is positioned at the mid point of the top plane of enclosure 4 and also open to a controlled growth environment. Though not pictured, each of the puncture points was covered in a similar enclosure to the enclosure 4. Blue light at an intensity of 40 lumens at a distance of one meter from the flexible bag 1 was used to initiate creation of the primordium, with additional primordium forming at each puncture site.

Figure 20:
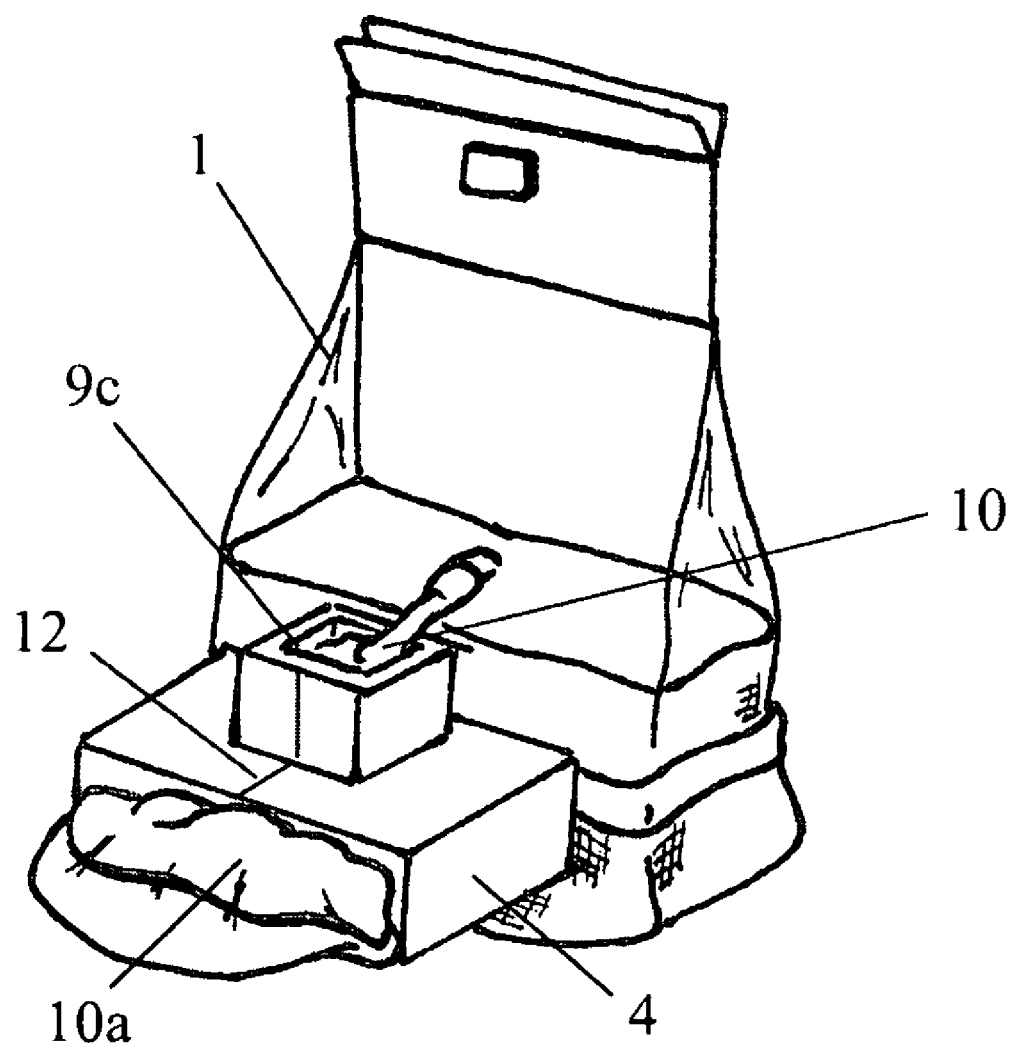
FIG. 20 shows the flexible incubation bag of FIG. 18 after additional days of fruiting body growth.

FIG. 20 shows a flexible incubation bag 1 one week after the attachment of the Enclosure 4. Additional incident light at a intensity of about 1,000 lumens illuminating an area of about 100 square feet, was cycled on/off at 12 hour intervals to encourage primordium to undertake stipe elongation along the width, height and depth of enclosure 4. This light exposure, in addition to exposure to CO2 concentrations of between 1500-3000 PPM encouraged a fungal stipe to begin growing along the 12"×24"×1" rectangular section. This stipe has diverged at orifice 9c creating a fungal feature 10 with dimensions equal to the conduit shape which forms orifice 9c. The stipe has also produced a fungal feature 10a which has dimensions equal to the enclosure 4, approximately 12"×24"×1", exiting at orifice 9b. Fungal feature 10a and fungal feature 10 together form a finished fungal part 11, which is pictured in FIG. 21.

At this stage, when then fungal stipe tissue has fully filled enclosure 4 and has reached both orifices, the fruiting body formed by fungal feature 10a and fungal feature 10 was cut away from the flexible bag 1 using a sterile scalpel and removed from enclosure 4 by opening enclosure 4 in a clam shell fashion along separation line 12 as pictured in FIG. 20.

Figure 21:
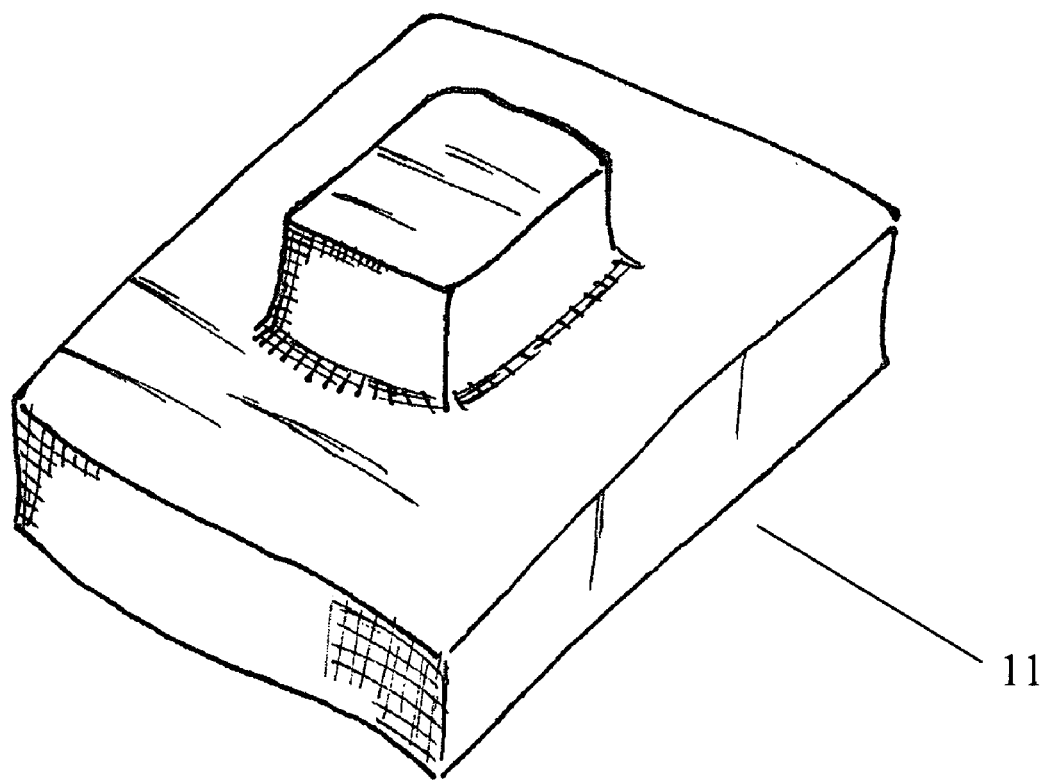
FIG. 21 shows the finished part created from the enclosure shown in FIG. 19 and FIG. 20.

After removing from the enclosure 4, finished fungal part 11 was dried for 45 minutes in a high capacity convection drying unit at 140 degrees Fahrenheit until the moisture content was below 7%. Finished fungal part 11 was then ready for use without any further post processing, as shown in FIG. 21.

EXAMPLE 8

Using Fruiting Body Particles and a Resin to Form a Ply

Byproducts from the aforementioned fruiting body processing, entire fully dried fruit, or any combination thereof can be chipped into either congruent or variable particles. These particles can be bound into a composite board using an organic (natural, example: mycelium) or synthetic resin. The material properties of the composite are adjustable based on resin type, particle composition and size.

The particles can be comprised of a single fungal species or a mixture of multiple species/strains, hence the waste streams from commercial mushroom cultivation can be implemented. Furthermore, other synthetic (example: plastics) or natural (example: rice husks) particles can be implemented to yield various material properties.

Figure 22:
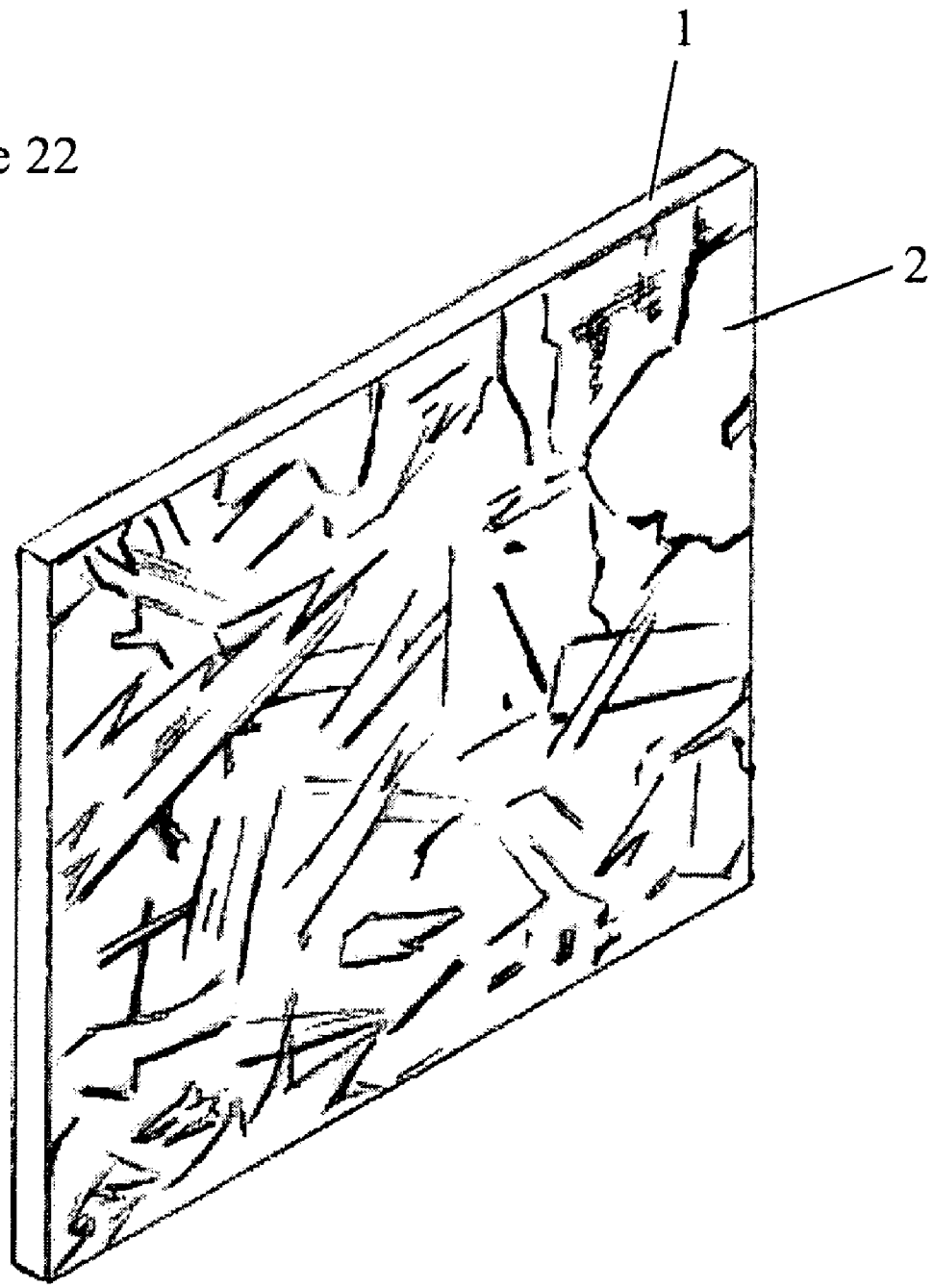
FIG. 22 shows a ply board made from chipped fungal fruit in accordance with the invention.

FIG. 22 shows a ply board 1 that was created using chipped fungal fruit 2 from the Ganoderma family. These fruiting bodies were chipped into ¼"×½"×⅛" sections and then wetted. Starch binder, applied at a concentration of 1% by weight, was used to bind the fruiting body fragments together. The starch binder and fruiting body chips were then placed in a 4×4' press and compacted at 100 PSI for 2 minutes. After pressing, the board was removed from the press and allowed to cure in a convection oven for 2 hours at 300 degrees Fahrenheit.

EXAMPLE 9

Post Processing the Fungal Board and Altering Material Properties

Fungal fruiting bodies and consequently the resultant board can be made to be hydro and hygro-philic, especially when the outer-surface of a formed fruiting body is removed via sanding or other means. This is believed to be due to the densely packed mycelial composition of the fruiting body. Mycelium is the network of hyphae that support the fruiting body and are typically hygroscopic[7]. This material property is highly advantageous for forming the processed material into structural forms using low energy processes. When moistened, the myco-material can be formed into any number of shapes, theses shapes will be later maintained after water extraction or submersion in a hydrophobic solution. The moisture content of the board is directly related to the elastic nature or plasticity of the material, with an effect on the tensile, compressive, and shear strengths. For example:
  As moisture content increases:
  elasticity increases, while elastic modulus decreases
  tensile strength increases
  compressive strength decreases
  As moisture content decreases:
  rigidity increases, thus as does the elastic modulus
  tensile strength decreases
  compressive strength increases
  If the material is compressed while moist, and then dried:
  density increases
  shear strength increase
  compressive strength increase

[7]

To prevent moisture damage or microbial growth, a sealant or laminate can be used such as with wood, an analogous cellulosic material. These treatments can vary from spayed on coatings of sealants and waxes (synthetic and natural), to other industrial or manual methods of application. Chemicals can be instituted for similar purposes and can have secondary/tertiary physical property effects.

Figure 23:
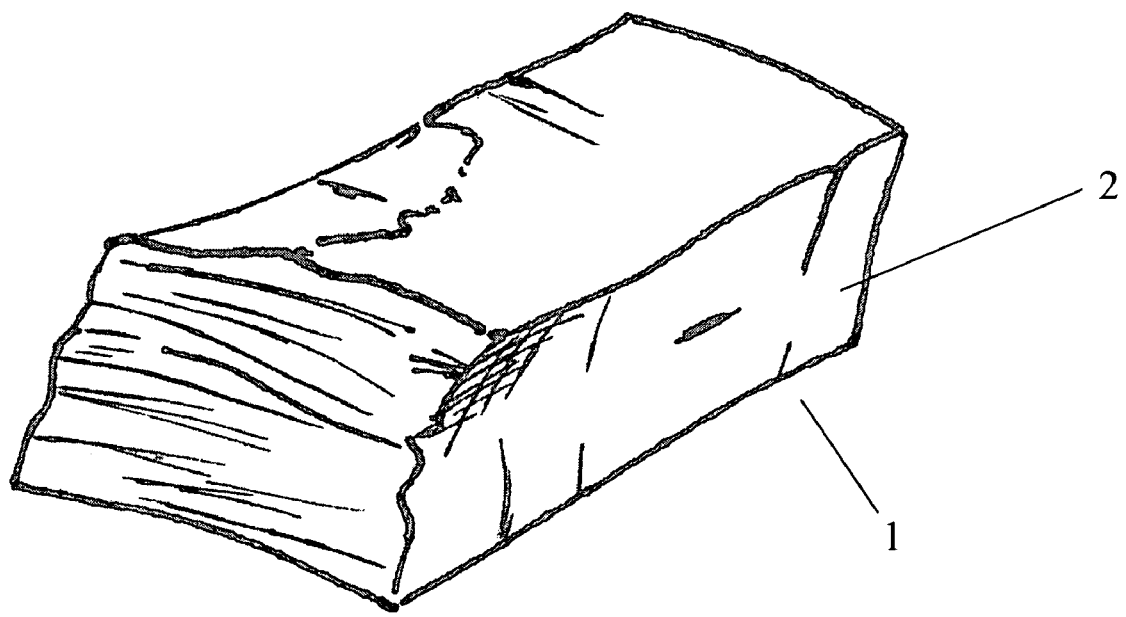
FIG. 23 shows a section of material ready for processing.

FIG. 23 shows a 2"×8"×4" block 1 of P. squamosus mycelia tissue which was grown using one of the methods described above. This sample has been sanded removing its outer skin and exposing the smooth dense internal tissue 2. This sample was grown into a rectangular shape form, but it is desired to use it in an application which requires the part to take on a U-shape. To achieve this, block 1 was submerged in 4 liters of water for 20 minutes, absorbing significant amounts of moisture and becoming very pliable.

Figure 24:
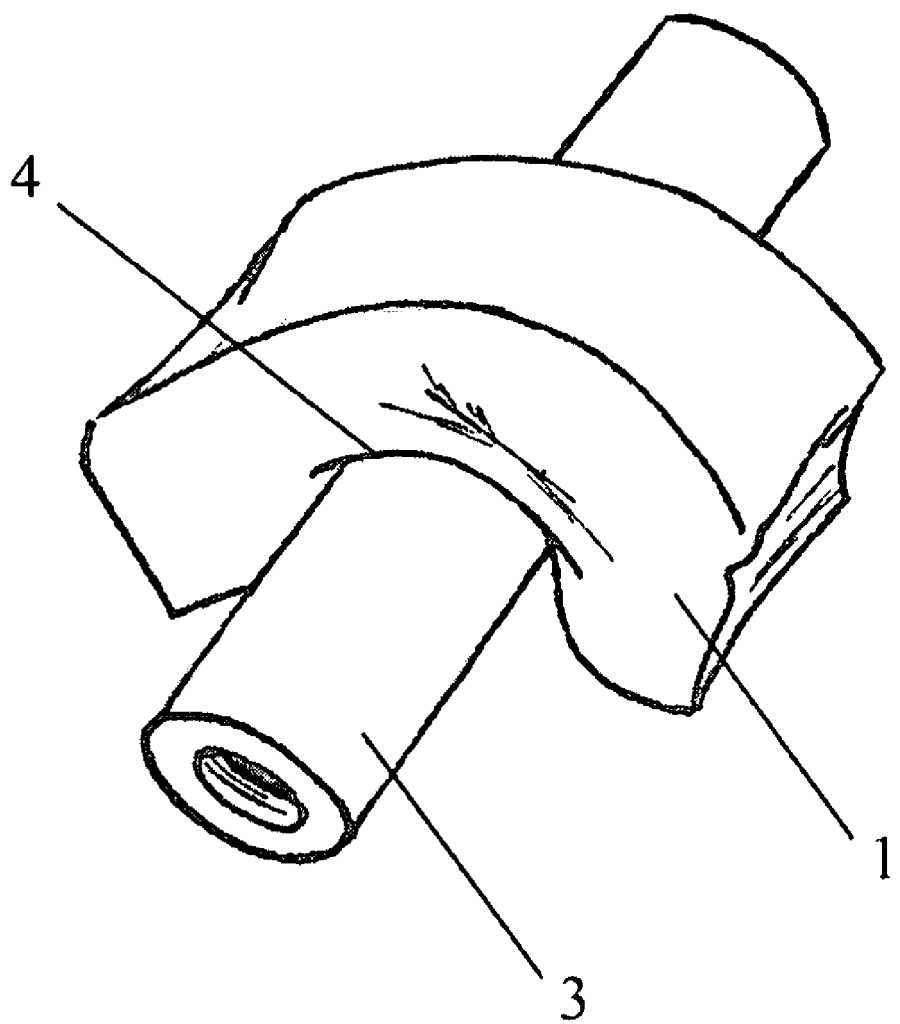
FIG. 24 shows the block of FIG. 23 fully moistened and pulled over a rod.

FIG. 24 shows the block 1 now fully moistened and pulled over a rod 3, which has a diameter of 2". The added moisture content allows block 1, which was previously very stiff and brittle, to be easily bent around rod 3, creating an internal radius 4, on block 1, which is equal to that of rod 3. After being pulled over rod 3, the block 1 is then dried in a convection oven at 300 degrees Fahrenheit for 4 hours until most of the moisture has been removed.

Figure 25:
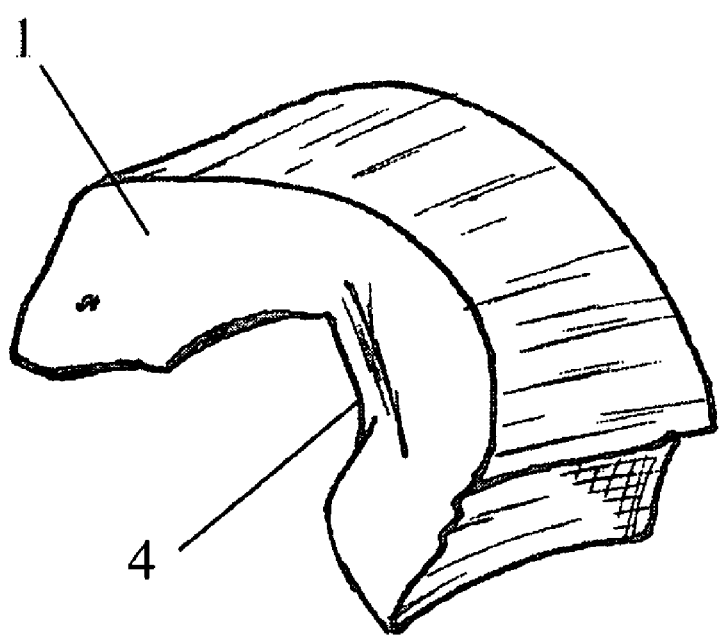
FIG. 25 shows the block of FIG. 24 fully dried and maintaining the shape conferred by the rod.

FIG. 25 shows block 1, now dried, preserving the radius 4, which was created during the forming process. Block 1 can now be used as is with no further post-processing.

If a certain moisture content is desired, to reach a desired elastic modulus for example, the sample could be removed from the dryer sooner, and laminated in a waterproof resin, locking the moisture inside the part and preserving the physical properties that exist at that moisture level. In such a way, composite parts can be formed with varying stiffnesses using the same tissue with differing moisture contents. Moisture content and elastic modulus are directly correlated, and this correlation can be used to determine anticipated tensile strength, elastic modulus/strength, shear strength/modulus, and compressive strength, on a sample of known geometries by modifying the moisture fraction of the samples total mass.

What is claimed is:

1. Method of growing a fungal fruiting body comprising the steps of
   exposing mycelium of a desired organism type to environmental conditions sufficient to induce fruiting of fungal primordium in said organism type;
   enclosing said fungal primordium within a mold of a designated shape representing a near net shape volume of a desired final product;
   allowing said fungal primordium to grow and fill the mold to form a mass of fungal tissue equivalent in shape to said designated shape of the mold;
   removing said mass of fungal tissue from the mold; and
   drying said mass of fungal tissue.

2. A method as set forth in claim 1 wherein said step of exposing mycelium of a desired organism type to environmental conditions includes exposing said mycelium to a varying amount of incident light.

3. A method as set forth in claim 2 wherein said step of exposing mycelium of a desired organism type to environmental conditions includes exposing said mycelium to a varying wavelength of incident light.

4. A method as set forth in claim 1 wherein said step of exposing mycelium of a desired organism type to environmental conditions includes exposing said mycelium to carbon dioxide gas.

5. A method as set forth in claim 1 wherein said step of exposing mycelium of a desired organism type to environmental conditions includes exposing said mycelium to variable temperature.

6. A method as set forth in claim 1 wherein said step of exposing mycelium of a desired organism type to environmental conditions includes exposing said mycelium to a relative humidity of from 85% to 90%.

7. A method as set forth in claim 1 further comprising the step of placing aggregate within the mold to allow said fungal primordium to grow about the aggregate to incorporate the aggregate within said mass of fungal tissue.

8. A method of growing a fungal fruiting body comprising the steps of
   creating a substrate capable of supporting growth of a desired fungal specie;
   inoculating said substrate with said specie;
   incubating said inoculated substrate under environmental conditions optimal for the mycelia of said fungal specie to fully colonize said substrate and mature to such a point as to support fruiting body growth;
   inducing pinning of said species in said substrate suitable for inducing pinning of at least one fungal primordium in said organism type;
   enclosing said fungal primordium within a mold of a designated shape representing a net shape volume of a desired final product; and
   allowing said fungal primordium to grow and fill the mold to form a mass of fungal tissue equivalent in shape to said designated shape of the mold.

9. A method as set forth in claim 8 wherein a plurality of fungal primordium are induced to grow and enclosed within the mold.

10. A method as set forth in claim 9 further comprising the steps of removing said mass of fungal tissue from the mold and thereafter drying said mass of fungal tissue.

11. A method as set forth in claim 8 further comprising the step of placing said substrate in a flexible bag of opaque material having at least one orifice therein for growth of said fungal primordium therethrough into the mold.

* * * * *